(12) United States Patent
Gallagher et al.

(10) Patent No.: US 7,900,481 B2
(45) Date of Patent: Mar. 8, 2011

(54) METHOD OF MAKING AN OPTICAL FIBER

(75) Inventors: Michael Thomas Gallagher, Corning, NY (US); Ming-Jun Li, Horseheads, NY (US); Joseph Edward McCarthy, Addison, NY (US); Ji Wang, Painted Post, NY (US); Luis Alberto Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1285 days.

(21) Appl. No.: 11/437,382

(22) Filed: May 19, 2006

(65) Prior Publication Data
US 2007/0266738 A1 Nov. 22, 2007

(51) Int. Cl.
*C03B 37/028* (2006.01)
(52) U.S. Cl. ............... 65/409; 65/406; 65/408; 385/124; 385/126
(58) Field of Classification Search .................. 385/123, 385/126, 127, 128, 124, 125; 65/385, 393, 65/403, 406, 412, 409, 413, 421, 427, 437, 65/439, 411
See application file for complete search history.

(56) References Cited

U.S. PATENT DOCUMENTS

| 4,395,270 | A  | * | 7/1983 | Blankenship et al. | .......... | 65/403 |
|---|---|---|---|---|---|---|
| 6,772,611 | B2 | * | 8/2004 | Kliner et al. | ..................... | 65/377 |
| 6,917,741 | B2 | * | 7/2005 | Fekety et al. | .................. | 385/125 |
| 7,200,309 | B2 | * | 4/2007 | Berkey et al. | .................. | 385/127 |
| 2001/0020373 | A1 | * | 9/2001 | Borrelli et al. | ................... | 65/393 |
| 2002/0114602 | A1 | * | 8/2002 | Tardy et al. | ..................... | 385/123 |
| 2003/0174985 | A1 | * | 9/2003 | Eggleton et al. | ............... | 385/125 |
| 2004/0050110 | A1 | * | 3/2004 | Berkey et al. | ..................... | 65/393 |
| 2005/0025965 | A1 | * | 2/2005 | Sanghera et al. | ............. | 428/364 |
| 2009/0201953 | A1 | * | 8/2009 | Peyghambarian et al. | ........ | 372/6 |

FOREIGN PATENT DOCUMENTS

WO WO 2004049025 A1 * 6/2004
WO WO 2006119334 A2 * 11/2006

OTHER PUBLICATIONS

"Adjacent" [online], [retrieved on Jul. 30, 2010], retrieved from: http://wordnetweb.princeton.edu/perl/webwn?s=adjacent.*
"Single-Polarization Single-Mode Optical Fibers"; Takanori Okoshi; IEEE Journal of Quantum Electronics; vol. QE-17; No. 6; Jun. 1981; p. 879-884.

(Continued)

*Primary Examiner* — Matthew J Daniels
*Assistant Examiner* — Yana Belyaev
(74) *Attorney, Agent, or Firm* — Svetlana Z. Short

(57) ABSTRACT

According to one embodiment a method of making optical fibers comprises: (i) manufacturing a core cane; (ii) situating a plurality of microstructures selected from rods, air filled tubes and glass filed tubes and placing said microstructures adjacent to the core cane, said microstructures forming no more than 3 layers; (iii) placing the core cane with said adjacent microstructures inside a holding clad tube; and (iv) placing interstitial cladding rods inside the holding (clad) tube, thereby forming an assembly comprising a tube containing a core cane, a plurality of microstructures and interstitial cladding rods. The assembly is then drawn into a microstructured cane and an optical fiber is drawn from the microstructured cane. According to several embodiments, the method of making an optical fiber includes providing at least one air hole and at least one stress rod adjacent to the core.

15 Claims, 15 Drawing Sheets

OTHER PUBLICATIONS

"A Broad-Band Single Polarization Optical Fiber"; Messerly et al; Journal of Lightwave Technology; vol. 9; No. 7, Jul. 1991; p. 817-820.

"Birefringence in Optical Fibers with Elliptical Cross-Section"; Electronics Letters; May 10, 1979; vol. 15; No. 10; p. 298-299.

"Single-Polarisation Single-Mode Optical Fibre with Refractive-Index Pits on Both Sides of Core"; Electronics Letters, Aug. 28, 1980; vol. 16; No. 18; p. 712-713.

* cited by examiner

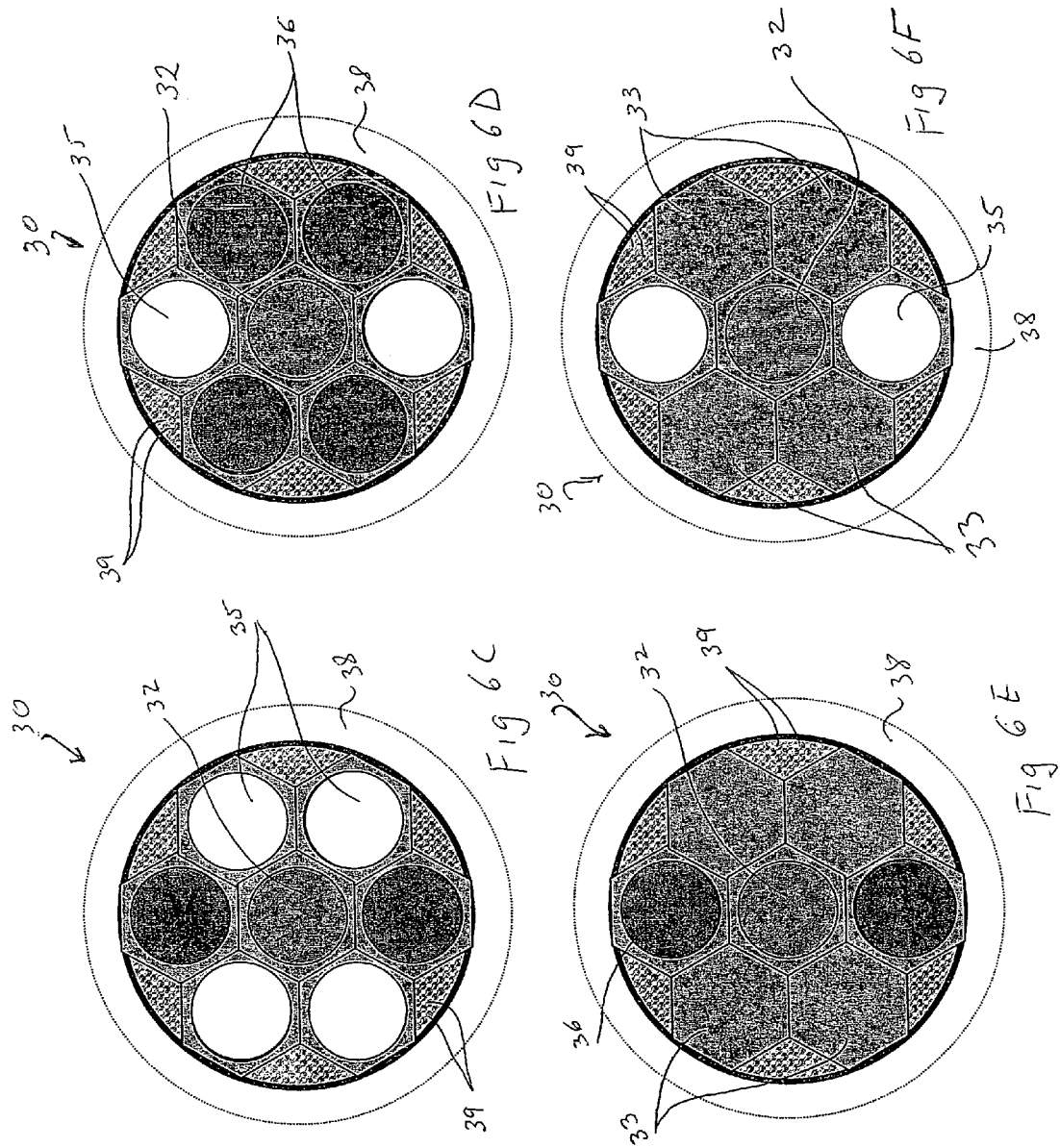

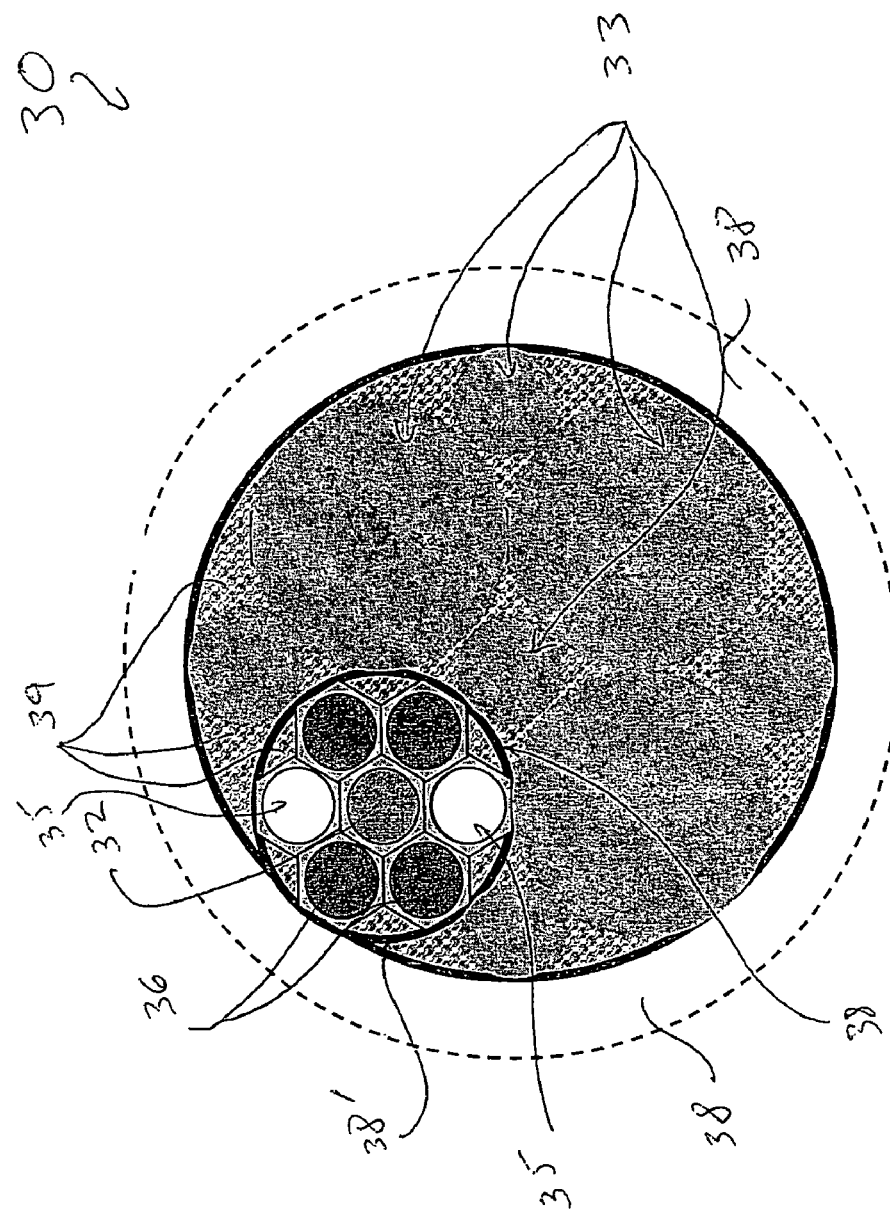

— By He@155'c
-o- By Ar@155c

-*- Yb2O3
-△- Al2O3

METHOD OF MAKING AN OPTICAL FIBER

BACKGROUND OF THE INVENTION

1. Field of the Invention

The present invention relates generally to a method of making optical waveguide fibers, and more particularly to a method of making optical fibers having a plurality of rods and/or holes.

2. Technical Background

BACKGROUND OF THE INVENTION

1. Field of the Invention

The present invention relates generally to polarization maintaining and single polarization optical fibers that include a plurality of rods and/or a plurality of air holes in the cladding area.

2. Technical Background

Optical fiber has become a favorite medium for telecommunications due to its high capacity and immunity to electrical noise. Polarization maintaining (PM) fibers and single polarization (SP) fibers have been widely used to produce linear polarized output in optical systems. These fibers are useful for ultra-high speed transmission systems and are also utilized as couplers fiber for use with, and connection to, optical components (e.g., lasers, EDFAs, optical instruments, interferometric sensors, and gyroscopes). The polarization maintaining fibers and single polarization fibers can either be active, which means that they are rare earth doped in the fiber core, or passive, which means no rare earth dopants are involved. The passive PM fiber is useful for advanced coherent-communication systems, whereas the active PM fiber allows a fiber laser to have higher brightness, which is one of the two most important factors (the other being power) in laser output performance.

Polarization retaining fibers (sometimes referred to as a polarization maintaining fibers) can maintain the input polarizations on two generally-orthogonal axes. These fibers are not single polarization fibers. A common polarization maintaining fiber includes stress birefringence members and includes, as shown in FIG. 1A, a circular core 12' surrounded by an cladding region 14'. Core 12' and the cladding region 14' are formed of conventional materials employed in the formation of optical waveguides. The refractive index of the core material is greater than that of the cladding material.

In FIG. 1A, diametrically opposed relative to core 12', are two stress-inducing regions 13' formed of a glass material having a Thermal Coefficient of Expansion (TCE) different from that of cladding material 14'. When such a fiber is drawn, the longitudinally-extending stress-inducing regions 13' and the cladding region will shrink different amounts, whereby regions 13' will be put into a state of tension or compression strain. Strain induced birefringence (otherwise referred to a stress-induced birefringence) is imparted in the fiber and thereby reduces coupling between the two orthogonally polarized fundamental modes. It should be recognized that such fibers including these stress-inducing regions 13' do not provide single polarization properties.

Conventionally, PM fiber is typically made by drilling two-holes, then filled with stress-rods, around core in the fiber preform, or by a chemical boron-soot etching process during core preform laydown stage in the MCVD 'Bow-tie' PM fiber making. Recent development in advanced fiber applications requires fiber with more complex structures. These structures are more difficult to obtain with the conventional manufacturing methods.

Single polarization fiber propagates one, and only one, of two orthogonally polarized polarizations within a single polarization band while suppressing the other polarization by dramatically increasing its transmission loss. Single polarization fibers with a plurality of air-holes are known, however such fibers have a high relative refractive index core delta which makes it difficult to achieve large mode field diameter. It has, therefore, been an area of ongoing development to obtain an optical fiber that will have single polarization performance and also has a large mode field area.

On the other hand, another ongoing development is to obtain an optical fiber that is single polarization with sufficiently wide operating bandwidth. This will make it possible for such fibers to be used in greater range of applications which require wider range of wavelength operating window and it will also make the deployment of such fibers to a specific application easier as one fiber can fit the need for applications with quite different operating wavelengths. Another desired feature is to have a single polarization fiber with a large mode area that is comparable or larger than conventional fibers such as Panda type polarization maintaining fibers. However, in order to achieve wide single polarization bandwidth (by using only a plurality of air holes), high fiber core delta is required to generate large enough index contrast for high birefringence. Therefore, to maintaining single mode operation, the fiber core must be small, which limits the use of single polarization fibers for high power application.

SUMMARY OF THE INVENTION

Definitions

The following definitions and terminology are commonly used in the art.

Refractive index profile—the refractive index profile is the relationship between the refractive index ($\Delta$%) and the optical fiber radius (as measured from the centerline of the optical fiber) over a selected portion of the fiber.

Birefringence—birefringence is the difference between the effective refractive indices of the two polarization modes.

Radii—the radii of the segments of the fiber are generally defined in terms of points where the index of refraction of the material used takes on a different composition. For example, the central core has an inner radius of zero because the first point of the segment is on the centerline. The outer radius of the central core segment is the radius drawn from the waveguide centerline to the last point of the refractive index of the central core having a positive delta. For a segment having a first point away from the centerline, the radius of the waveguide centerline to the location of its first refractive index point is the inner radius of that segment. Likewise, the radius from the waveguide to centerline to the location of the last refractive index point of the segment is the outer radius of that segment. For example, an down-doped annular segment surrounding the central core would have an outer radii located at the interface between the annular segment and the cladding.

Relative refractive index percent $\Delta$%—the term $\Delta$% represents a relative measure of refractive index defined by the equation:

$$\Delta\% = 100 \times (n_i^2 - n_c^2)/2n_i^2$$

where $\Delta$% is the maximum refractive index of the index profile segment denoted as i, and $n_c$, the reference refractive index, is taken to be the refractive index of the cladding layer.

Every point in the segment has an associated relative index measured relative to the cladding.

In accordance with some embodiments of the present invention, an optical advantageously exhibits a large mode field (core radius of at least 4 μm, preferably at least 7 μm and more preferably at least 9 or 10 μm, and/or effective area of at least 50 μm, preferably of at least 153 μm², more preferably of at least 250 μm² and even more preferably of at least 315 μm², high birefringence ($1\times10^{-4}$ and higher), and either polarization maintaining (retaining) properties or single polarization, while being suitable for use as an optical amplification or laser gain media.

A method of making optical fibers comprising:
(i) manufacturing a core cane;
(ii) situating a plurality of microstructures selected from rods, air filled tubes and glass filed tubes and placing said microstructures adjacent to said core cane, said microstructures forming no more than 3 layers;
(iii) placing said core cane with said adjacent microstructures inside a holding clad tube; and
(iv) placing interstitial cladding rods inside said holding tube, thereby forming an assembly comprising a tube containing a core cane, a plurality of microstructures and interstitial cladding rods;
(v) drawing said assembly into a microstructured cane; and
(vi) drawing an optical fiber from said microstructured cane.

According to several embodiments, the method of making an optical fiber includes providing at least one air hole and at least one stress rod adjacent to the core.

Additional features and advantages of the invention will be set forth in the detail description which follows, and in part will be readily apparent to those skilled in the art from that description or recognized by practicing the invention as described herein, including the detailed description which follows, the claims, as well as the appended drawings.

BRIEF DESCRIPTION OF THE DRAWINGS

FIGS. 6A-6H illustrate schematically several embodiments of the stacked microstructured cane utilized in making an optical fiber according to the present invention.

DETAILED DESCRIPTION OF THE EMBODIMENTS

Figure 1A:
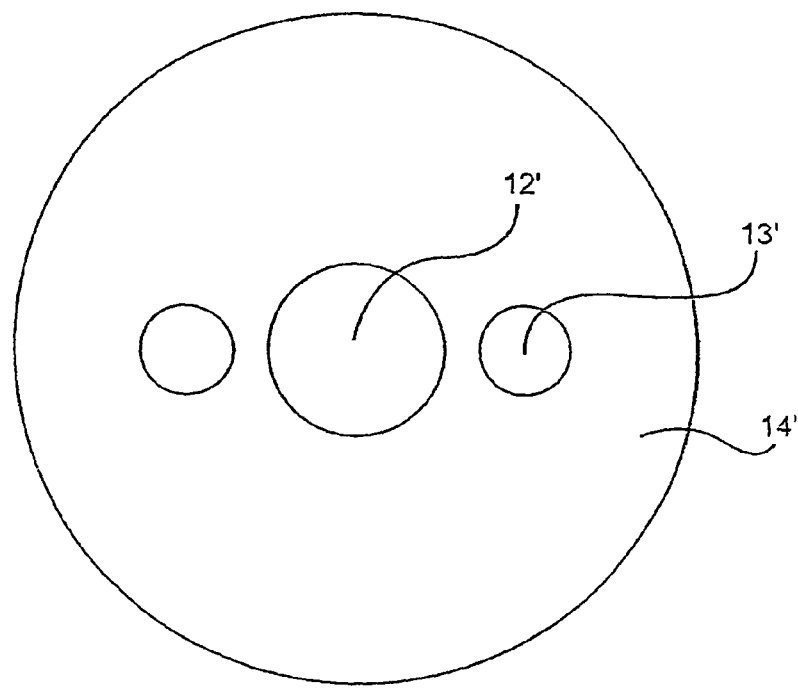
FIG. 1A is a schematic cross-sectional view of a prior art optical fiber.

In single polarization fibers that use only air holes, the air holes contribute to both the role of inducing high birefringence and to control the fundamental-mode cutoff wavelength, so that the single polarization wavelength operating window is located at the desired wavelength range. By introducing additional stress members, the roles of inducing high birefringence and of controlling fundamental mode cutoff can be separated, so that we can independently increase the birefringence and further induce the fundamental mode cutoff to occur at the right wavelength window. The advantage is to have a single polarization fiber with larger mode field and larger single polarization operating window.

Below, we explore through different embodiments of both active and passive single polarization fibers. With a proper choice of wavelength, these fibers can also behave as polarization maintaining fibers in certain wavelength range.

Reference will now be made in detail to the present preferred embodiments of the invention, examples of which are illustrated in the accompanying drawings. Whenever possible, the same reference numerals will be used throughout the drawings to refer to the same or like parts. Two embodiments of double clad single polarization optical fiber in accordance with the present invention are shown schematically in FIGS. 1B and 1C, and are designated generally throughout by the reference numeral 10. The optical fiber 10 illustrated in FIG. 1B includes: silica based, core 12 doped with rare earth materials and having a first index of refraction $n_1$; a first silica based cladding 14 (inner cladding) surrounding the core 12 and having a second index of refraction $n_2$, such that $n_1 > n_2$; and a silica based outer cladding 16 surrounding the first cladding 14 and having a third index of refraction $n_3$ such that $n_3 < n_2 < n_1$. The first cladding (inner cladding) 14 is preferably round to enable easy coupling between the optical fiber 10 and the light source and easy splicing, and contains at least two stress applying parts, for example stress rods 13 and 15 located on diametrically opposite sides of the core 12 along the line Y-Y. The stress applying parts have a thermal expansion coefficient that is different from that of the inner cladding. The stress applying parts create stress birefringence. The refractive index of the stress applying parts is $n_4$. Preferably $n_4 \leq n_2$ to avoid forming a waveguide in the stress applying parts (stress rods themselves). The stress rods advantageously improve birefringence of the optical fiber 10 and reduce the need for the high core refractive index delta, which facilitates large mode field area and enables the fiber core radius $r_1$ to be larger than 4 μm, preferably larger than 7 μm, and more preferably larger than 10 μm. The inner cladding 14 also contains at least two air holes 24, 26, preferably situated on diametrically opposite sides of the core 12 and extending along the core 12, through the length of the fiber 10. The air holes 24, 26 lower the effective refractive index of the inner cladding 14 along the line A-A that is preferably perpendicular to the line Y-Y of the stress applying parts illustrated in FIG. 1B. The two air holes 24 and 26 have a refractive index of $n_5=1$. The air holes have two functions. First, the air holes create form birefringence, which adds to the stress birefringence, so as to enable a larger total birefringence. Second, the air holes can be utilized to cut off one polarization mode, which makes a single polarization fiber. The core 12, inner cladding 14 and the outer cladding 16 are made of glass. A protective coating 18 surrounds the outer cladding 16. The outer coating 18 may be, for example, an organic coating which typically includes a softer primary coating and a harder secondary coating applied over the primary coating.

In this embodiment the silica based core 12 is doped with Yb, but other rare earth materials, such as Er, Nd, Tm, Tb, Sm, Gd, Pr may also be utilized and may co-doped with additional dopants such as Al, B, F as de-clustering agent. If the core does not contain the optional rare earth materials, optical fiber will be a passive fiber exhibiting polarization maintaining, and/or the single polarization property. The core 12 may also include at least one index raising dopant among the following: Al, Ge, Y, La, Sb, P. The inner cladding 14 may also include at least one index rising dopant. Preferably, the index raising dopant is Ge for the core and cladding, and the relative refractive index delta of the core with respect to the inner cladding is between 0.05% and 0.5%, more preferable between 0.1% and 0.2%, and even more preferably between 0.08% and 0.13%. This core delta results in large mode area fiber. The core radius $r_1$ is larger than 4 μm and preferably is in the range of 4-50 μm, more preferably in the range of 10-25 μm which also facilitates large mode area. Typical core radii are, for example, 10 μm, 11 μm, 12 μm, 13 μm, 15 μm, 16 μm, 18 μm, 20 μm, and 22 μm. The relative refractive index delta of the inner cladding 14 with respect to the outer cladding 16 is between 1% to 3%, more preferably between 1.5 and 2.5%. The inner cladding diameter $D_{IN}$ is preferably at least 125 μm, more preferably at least 145 μm, and more preferably at least 200 μm. It is even more preferable that inner cladding diameter $D_{IN}$ is at least 225 μm and most preferable at least 250 μm. The outer cladding 16 further preferably includes an index lowering dopant, such that $n_2 > n_3$. Preferably, the index lowering dopant is F, and/or B. It is preferable that the outer cladding 16 be relatively thin, with wall thickness less than 80 μm and preferably between about 5 μm and 35 μm. It is most preferable that the wall thickness of the outer cladding 16 be between about 15 μm to 25 μm. The stress applying parts can be pure silica, porus silica or doped silica. Preferably, the doping material of the stress applying parts (e.g., rods 13 and 15) is B, or Ge, or P or their combinations. If the stress applying parts (e.g., rods 13, 15) have a circular cross-section, the radius of the rods $r_4$ is preferably between 10 μm to 100 μm. However, the rods may also have a non circular (for example, elliptical) cross-section with at least one cross-sectional axis or dimension being 10 μm to 100 μm (for example, 20 μm, 25 μm, 30 μm, 40 μm or 50 μm). The rod's center is situated at a distance $r_4c$, where $r4_c$ is between 5 to 100 μm from the core's center. For application wavelength longer than 1300 nm, the distance between the edge of the core 12 and the outer diameter of the stress rod is preferably at least 3 μm, and more preferably 5 μm to 10 μm because of tradeoff between fiber attenuation and birefringence. The air hole radius $r_5$ is preferably between 2 to 50 μm, (for example 5 to 25 μm). The air holes are preferably situated directly adjacent to the core. Applicants discovered that the thick inner cladding 14 and all-glass construction of the optical fiber work in synergy to allow the optical fiber to be coupled to high energy source, and to couple the high power into the core without damaging the optical fiber. The two stress applying parts and the two air holes introduce high stress and form birefringence, enhancing the fiber's polarization maintaining properties. The two air holes also reduce the refractive index of one of the fundamental polarization modes, which enable the optical fiber to be a single polarization fiber.

Figure 2:
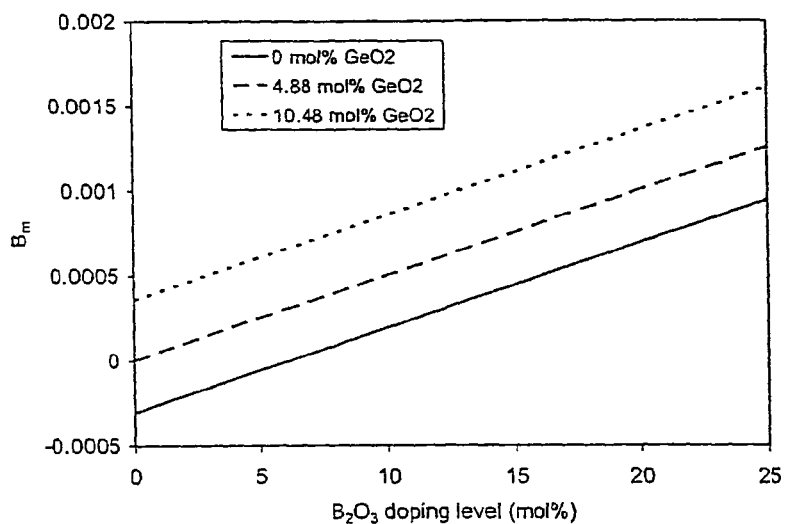
FIG. 2 illustrates material birefringence factor vs. boron dopant level in the stress rods.

The stress birefringence of the stress rods 13, 15 depends on dopant type and its concentration in the stress rods, as well the size and location of the stress rods. The average stress birefringence provided by the stress rods 13, 15 can be estimated by the following equation $$B = B_m \frac{r}{r_c} \left[ 1 - 48 \left( \frac{r}{R} \right)^4 \right]$$

where r is the radius of the stress rod, $r_c$ is the center position of the stress rod relative to the fiber center, R is the fiber radius, $B_m$ is a factor that depends on glass material properties:

$$B_m = \frac{2EC\Delta\alpha_T \Delta T}{1 - v}$$

where E is the Young's modulus, C is the photoelastic constant, $\Delta\alpha$ is the difference in thermal expansion coefficient between the stress rod and the surrounding glass, v is the Poisson's ratio and $\Delta T$ is the difference between room temperature and the softening temperature of the stress rod. FIG. 2 shows $B_m$ of the rods 13, 15 as a function of $B_2O_3$ doping level for three cases: rods without co-doing with $GeO_2$, rods co-doped with 4.88 mol % $GeO_2$ and rods co-doped with 10.48 mol % $GeO_2$. In this example, the inner cladding 14 is made of silica doped with 4.88 mol % $GeO_2$. It is seen that the birefringence factor increases linearly with the rod's $B_2O_3$ doping level for all the three cases. For the case without $GeO_2$ in the stress rod, the value of $B_m$ is negative because the thermal expansion coefficient in the stress rod is less than that of the inner clad doped with 4.88 mol % $GeO_2$. Co-doping silica based $GeO_2$ doped rods with $B_2O_3$ increases the difference in thermal expansion coefficient, thus increases the birefringence factor. However, because $GeO_2$ increases the refractive index, $B_2O_3$ dopant has to be adjusted accordingly to avoid forming a waveguide in the stress rods. For example, if the stress rod is doped with 10.48 mol % $GeO_2$, the $B_2O_3$ level must be greater than 10 mol % to insure that the refractive index of the rod 13, 15 is below the refractive index of the inner cladding 14.

Figure 3:
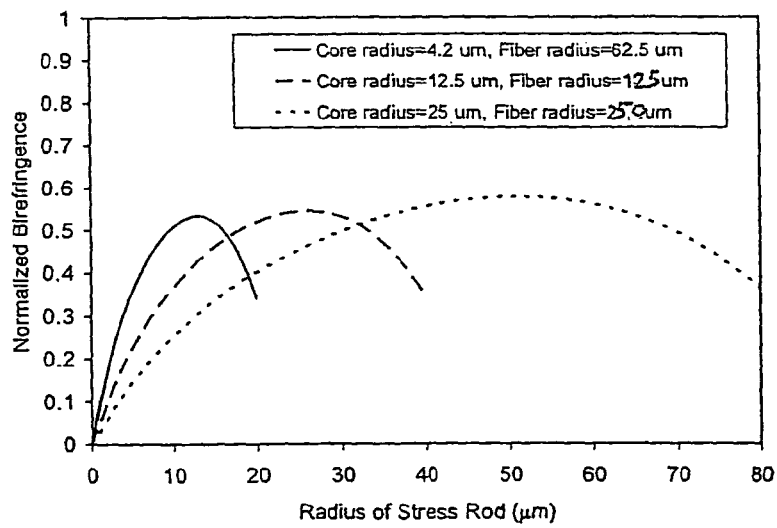
FIG. 3 shows normalized birefringence as a function of the stress rod radius.

For a stress rod with given dopants and concentrations, the total birefringence in the fiber core depends on the size and location of the stress rods. In general, placing the stress rod close to the core will increase the birefringence. However, for stress rods doped with $B_2O_3$, fiber loss will increase when moving the rods close to the core for operating wavelength longer than 1300 nm. It is preferable in these cases that the distance between the core edge and stress rod edge is greater than 5 μm. FIG. 3 plots the normalized birefringence $B/B_m$ as a function of stress rod radius for three fiber radii, 62.5, 125 and 250 μm. In FIG. 3, the distance between the core edge and stress rod edge is kept to a constant of 5 μm. For each fiber radius, there is an optimum radius for the stress rod that maximizes the birefringence. For three cases, the optimum radii of stress rod are 13, 26, and 52 μm, respectively.

It is preferable that the diameter of the outer cladding diameter ($D_{OUT}$) be about 145 to 2100 μm, more preferably between about 145 μm to 1600 μm and even more preferable that $D_{OUT}$ be about 145 μm to 500 μm. If the inner cladding 14 does not have a circular cross section, Din is defined as the smallest distance from one side of the inner cladding's cross section to the oppositely situated side of the cross section. It is also noted that the outer cladding 16 may not be circular. If the outer cladding 16 is not circular, $D_{OUT}$ is defined as the smallest distance from one side of the outer cladding's cross section to the oppositely situated side of the outer cladding's cross section. It is preferable that the inner cladding's 14 cross-sectional area be at least 200 times larger than the cross sectional area of the core 12. It is even more preferable that the cross sectional area of the inner cladding 14 be between 300 and 3000 times larger than the cross sectional area of the core 12. For example, the cross sectional area of the inner cladding 16 may be 500, 700, 1000, 1200, 1500, 1600, 2000 or 2500 times larger than the cross sectional area of the core 12.

According to this embodiment, the fiber core 12 includes, in weight percent:

| | |
|---|---|
| Rare earth | 0.1 to 2.5 wt %; |
| P | 0 to 5 wt %; |
| Al | 0.5 to 15 wt %; |
| Ge | 0.1 to 15 wt %; |
| F | 0 to 1 wt %. |
| B | 0 to 10 wt % |

The rare earth dopants in the fiber core 12 provide active ions to enable either a gain or a lasing action. Exemplary rare earth dopants are Yb, Er, Nd, Tm, Sm and Tb. If active fibers are desired, it is preferable that the amount of rare earth dopant in the core 12 be 0.1 wt % to 2 wt %. Phosphorus may be added to the core materials in order to lower the softening temperature of the core glass, which may be advantageous if the core is produced by the inside vapor deposition process. Phosphorus may also be utilized as a refractive index raising agent. However too much phosphorus (10% or more) provides nonlinearity through Stimulated Raman Scattering which may inhibit the lasing action. Aluminum may be added to the core as a de-clustering agent (for example, to de-cluster Yb, preferably at the ratio of Al to Yb of 3:1 to 10:1). The core 12 may also include Germanium which is an index raising dopant, and/or fluorine which is an index lowering dopant as well as a de-clustering agent.

The preferred ranges of the core 12 composition in weight percent are:

| | |
|---|---|
| Rare earth | 0.3 to 1 wt %; |
| P | 0 to 2 wt %; |
| Al | 2 to 8 wt %; |
| Ge | 3 to 15 wt %; |
| B | 0 to 4 wt %; and |
| F | 0.1 to 0.5 wt %. |

The Yb-doped core 12 will laze at 1.03-1.11 micron range.

It is preferable that the inner cladding 14 contain 5 wt % to 30 wt % Ge in order to provide high NA. It is even more preferable that the inner cladding comprise 5 wt % to 20 wt % Ge. It is noted that 5 wt % to 10 wt % Ge works well for many applications.

It is preferable that the stress applying parts 13, 15 contain Boron. It is more preferably to add Germanium to balance the refractive index of the stress parts. The preferred ranges for Boron and Germanium dopants in the stress rods, in weight percent, are:

| | |
|---|---|
| B | 5 to 30 wt % |
| Ge: | 5 to 20 wt %. |

It is preferable that the index lowering dopant of the outer cladding 16 comprises Fluorine and/or Boron in weight percent:

| | |
|---|---|
| F | 0.5 to 5 wt %; |
| B | 0.5 to 20 wt %. |

The amount of dopant(s) for the outer cladding 16 is chosen to preferably result in inner cladding NA of between 0.18 to 0.5. However, it is preferable that the outer cladding 16 contain at least one of B or/and F. It is preferable that the amount of B is at least 3 wt %. It is preferable to have more than 1 wt % and more preferably more than 2 wt % of F along with more than 8 wt % of B in the outer cladding 16. It is even more preferable that the amount of B and F be: 2 to 4 wt % of F and 3 to 15 wt % of B.

Figure 4A:
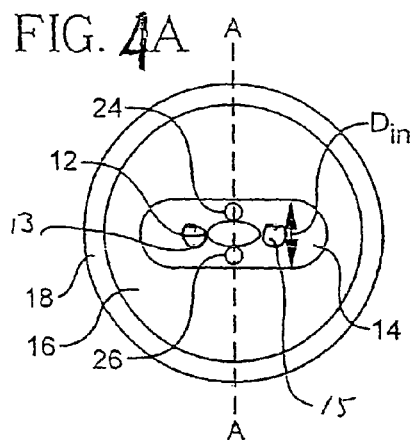
FIGS. 4A-4C are schematic cross-sectional views of other embodiments of the present invention.
Figure 4B:
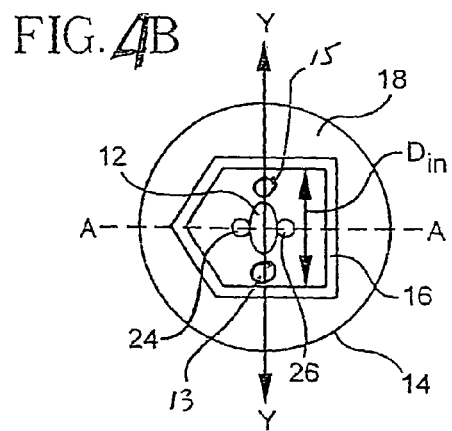
Figure 4C:
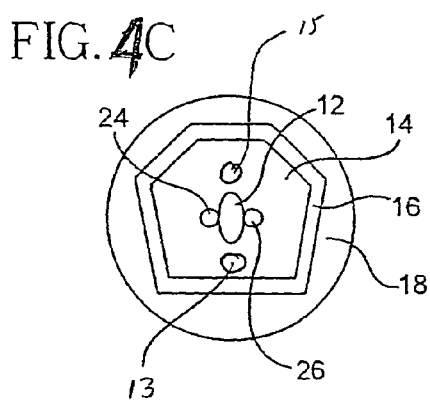

The inner cladding 14 of the optical fiber is preferably circular, but may be non-circular as shown in FIGS. 4A-4C is non-circular. The advantage of non-circular inner cladding 14 is that non-circular shape improves the absorption of optical pump power into the core 12. The elongated core 12 may be located either at the geometric center of the inner cladding, or may be displaced from the geometric center of the inner cladding.

The optical fiber core 12 is preferably circular, but may be elliptical, as shown in FIGS. 1B, 1C and 4A-4C, but may have other non-circular shapes. The core can also be helically placed along the central axis of the fiber. Adjacent to the core and situated at least partially within the inner cladding 14 are at least two air holes 24, 26. The elongated (elliptical) core 12, in conjunctions with the air holes 24, 26 renders this optical fiber a single polarization (SP) fiber. It is preferred that the aspect ratio (ratio of major to minor axis) of the elliptical core 12 be at least 1.5:1 and more preferably be between 2:1 and 10:1, because these aspect ratios improve birefringence of the core 12.

The core delta is less than 1%Δ and preferably less than 0.5%Δ. The numerical aperture NA of the core 12 is between 0.04 (for high power laser application) and 0.25 (for lower power application). The numerical aperture NA of the core 12 is defined as $(n_1^2-n_2^2)^{1/2}$, where $n_1$ is the index of refraction of the core 12 and $n_2$ is the index of refraction of the inner cladding 14.

Figure 1B:
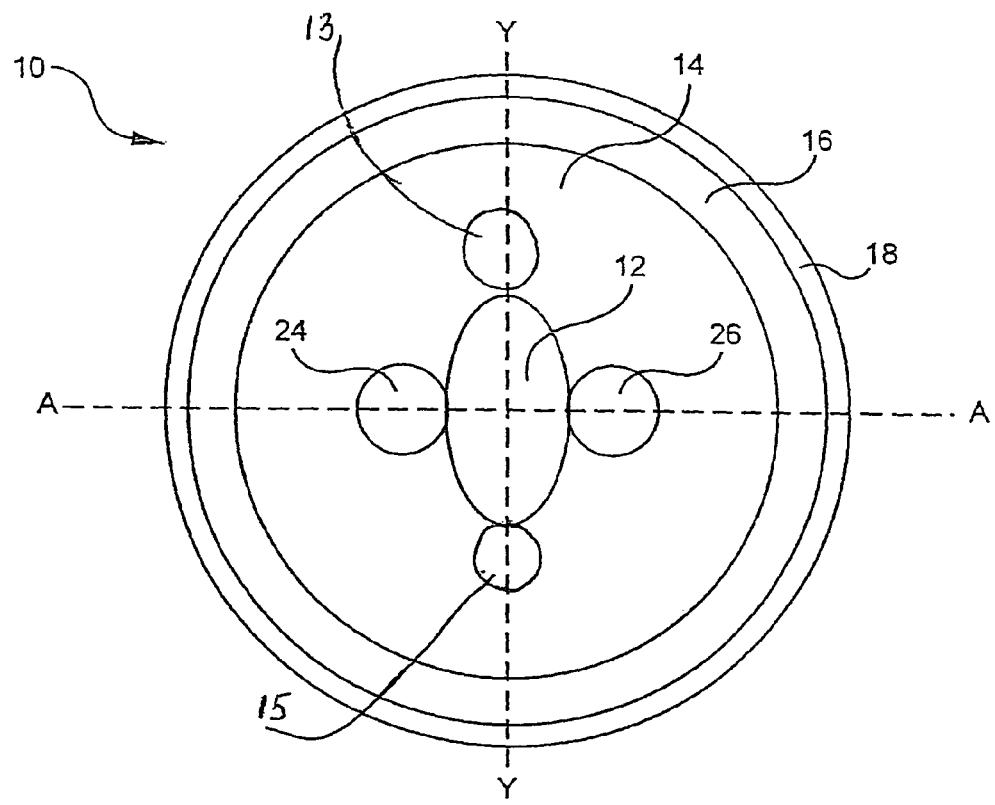
FIGS. 1B and 1C is a schematic cross-sectional view of two embodiments of the present invention.
Figure 1C:
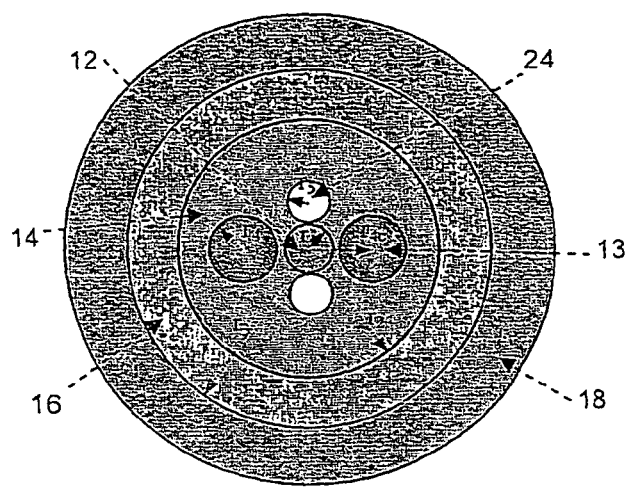

The silica based inner cladding 14 may have a circular outer perimeter, as shown in FIGS. 1B and 1C (can be with an off-center situated core), or a non-circular outer perimeter as shown in FIG. 4A-4C. The numerical aperture NA of the inner cladding 14 is defined as $(n_2^2-n_3^2)^{1/2}$, where $n_3$ is the index of refraction of the outer cladding layer 16. The inner cladding preferably has numerical aperture NA between 0.15 and 0.45 and more preferably between 0.3 and 0.4.

In general, a double-clad structure that could be used in a fiber laser or in an amplifier includes two claddings. A first (inner) multi-mode cladding acts as a multi-mode pumping core. The inner cladding 14 is adjacent to the core 12 and a second (outer) cladding 16 surrounds the first or the inner cladding 14. The core 12 may be either single mode or multi-mode at the core lasing wavelength. The inner cladding 14 serves as a waveguide with a high numerical aperture NA for the input (pumping) light. That is, the inner cladding serves as a pump cavity. The larger the inner cladding diameter, the more pump light is coupled into the inner cladding from the optical source. The cross-section of the first multi-mode inner cladding ($D_{IN}$ is the shorter dimension of the inner cladding as seen in FIGS. 4A-4C) may be designed to have a desired shape, e.g., matched to the near field shape of the pump source or have any other which increases coupling efficiency of the (pump) light from the light source to the inner cladding. The numerical aperture of the inner cladding must be high enough to capture the output of the light source, such as the laser diode. Recent progress in semiconductor laser technology has led to the creation of light sources utilizing discrete or arrayed broad-area laser diodes coupled to the intermediate fiber incorporated within the light source. The output power of this light source is more than 150 Watt at 976 nm at the output end of the intermediate fiber. The diameter of the intermediate fiber and NA of light source is 200 μm and 0.22 NA, respectively.

Figure 5A:
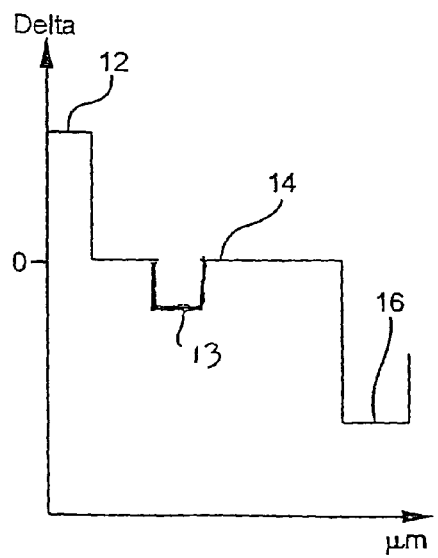
FIGS. 5A and 5B illustrate schematically relative a refractive index profiles of an exemplary optical fiber of the present invention, across two different cross-sections of the fiber.
Figure 5B:
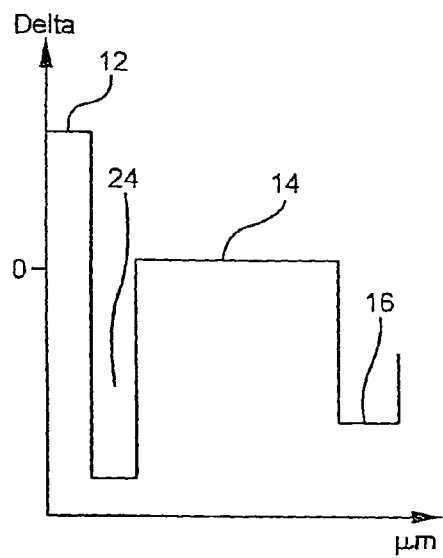

FIGS. 5A and 5B illustrate schematically relative refractive index profiles of an exemplary embodiment of the optical fiber 10. FIG. 5A is the relative refractive index profile across the stress rods, along the line Y-Y. FIG. 5B is the relative refractive index profile across the air holes rods, along the line A-A.

The light from this light source is then coupled to a double clad optical fiber via high NA and large aperture lenses. With this approach one can obtain 85-90% of coupling efficiency.

EXAMPLES

The fiber structure can be used to design fibers with large birefringence, or with large single polarization window. The table below (Table 1) shows six exemplary fiber embodiments with different fibers parameters. For all the six examples, the inner cladding 14 is doped with 4.88 mol % $GeO_2$, which corresponds to an index delta of 0.52%. The stress rods 13, 15 are doped with 20.8% $B_2O_3$. The stress rod radius and location are selected according to the fiber radius and the core radius to give maximum stress birefringence. In the first example, the fiber core has a relative refractive index delta of 0.2% with respect to the inner cladding, and a core 12 radius of 4.2 μm. The stress rods 13, 15 in this example do not contain $GeO_2$. The air hole radius is 5 μm. As shown in the table, the birefringence is calculated to be 0.00032. The birefringence can be increased if the stress rods are doped with $GeO_2$ in addition to $B_2O_3$. In the second example, the fiber parameters are the same as in the first example except that the stress rods 13, 15 contains 4.88 mol % $GeO_2$. It is can be seen that the birefringence is increased to 0.00038. In the first two examples, both fundamental polarization modes can propagate at the wavelength of 1060 nm, so the fibers are of the polarization maintaining type. Single polarization fiber can be designed if one polarization mode is cut off at the operating wavelength window. In the third example, to create a fundamental mode cutoff, the core refractive index delta is lowered to 0.17% and the air hole size is increased to 6 μm. The fiber 10 of the third example utilizes Yb doped Si based core and becomes a single polarization fiber at the 1060 nm window (i.e., in the range of about 1000 nm to about 1200 nm). If Er is used instead of Yb, the single polarization window will be centered at about 1550 nm (corresponding to the wavelength range of about 1520 nm to about 1580 nm). The single polarization bandwidth of this fiber is 150 nm. If no active element is used in the core, the fiber will be a non-active or passive single polarization fiber (i.e. it will not provide gain). The single polarization window can be enlarged further if the fiber birefringence is increased. In the fourth example, the fiber has larger stress rods with a radius of 24.5 μm. The fiber core 12 has a refractive index delta of 0.1% and a core radius of 5 μm. The air hole radius is 10 μm. This fiber has a much larger single polarization window of 325 nm. In some applications, large mode area is desired. In the fifth example, the fiber has a core refractive index delta of 0.1% and a radius of 12.5 μm. The fiber (of the fourth example) has a birefringence of 0.000125. In the sixth example, the fiber has an even lager core with a radius of 25 μm. The fiber has a birefringence of 0.00025. In the last two examples of fibers with large core size (examples E and F), the fibers are not single polarization fiber, and are not single mode fiber because higher order modes exist. However, these fibers (Ex. E and F) can behave like single mode polarization maintaining (PM) fibers or like single polarization fibers under proper bending conditions, because higher order modes and the low index fundamental mode have higher loss and can be stripped off. The fiber bending radius that achieves that is in the range of 2.5 to 15 cm.

The examples show that the new structure is particularly suitable for making large mode area fiber with large birefringence. Fibers with core radius as large as 25 μm can be achieved, which result in large mode size. Fiber birefringence is in the range of about 0.0001 to 0.0004 are illustrated, which is suitable to make PM fibers. Two design examples with single polarizations operations are also shown in the table. Large single polarization window of greater than 100 nm, and as large as 150 nm or 200 nm is possible.

Stress-rod and air hole co-assisted large mode area fiber design shown in FIG. 1B is suitable, for example, for multi-kilowatt, high power fiber laser oscillators and amplifiers. Due to the broad gain spectrum in high power fiber laser oscillators, stimulated Raman scattering (SRS) is a prevalent nonlinear optical impairment. The proposed design approach mitigates SRS through the use of air holes diametrically placed around the core. Air holes 24, 26 cause an effective core index that is below the cladding index for longer wavelength. Through proper placement and sizing of the holes, the fiber can serve as a distributed filter for the Raman-generated Stokes line, thus raising the SRS threshold into the tens of kilowatts regime. In fact, the use of holes as an SRS filter may enable the use of single mode cores in kW-level fiber oscillators. This would remove the need for bend-induced spatial mode discrimination currently necessary with the large cores used for high power fiber laser applications. The resultant distributed spectral filter can also be used to induce lasing at wavelengths that are otherwise inaccessible in standard step index fibers. By the introduction of higher loss at longer wavelengths, fiber lasers based on Yb, Nd, Er, or Tm can be made to operate at shorter wavelengths than in a free-running mode. This enhanced tunability can be immensely useful in applications requiring specific laser wavelengths, such as harmonic generation.

Another benefit of the hole-assisted, microstructured geometry is a polarizing effect. As the holes are diametrically placed along only one axis, a polarization-dependent cutoff arises, resulting in the propagation of only one linearly polarized mode within a specified spectral band. The single polarization operating bandwidth can be broadened by raising the birefringence. Stress rods are proposed to provide the requisite birefringence increase.

Double clad fibers generally require non-circular inner cladding geometries in order to effectively absorb the pump. Such non-circular, hexagonal or octagonal shapes can introduce fiber splicing difficulties as well as residual stress in the outer cladding that can reduce long term fiber reliability. In the proposed novel fiber designs, micro-structuring around the core, in the form of holes or stress rods, can serve to break the radial symmetry, thus enabling the use of less complicated, more reliable circular inner cladding geometries.

Figure 6B:
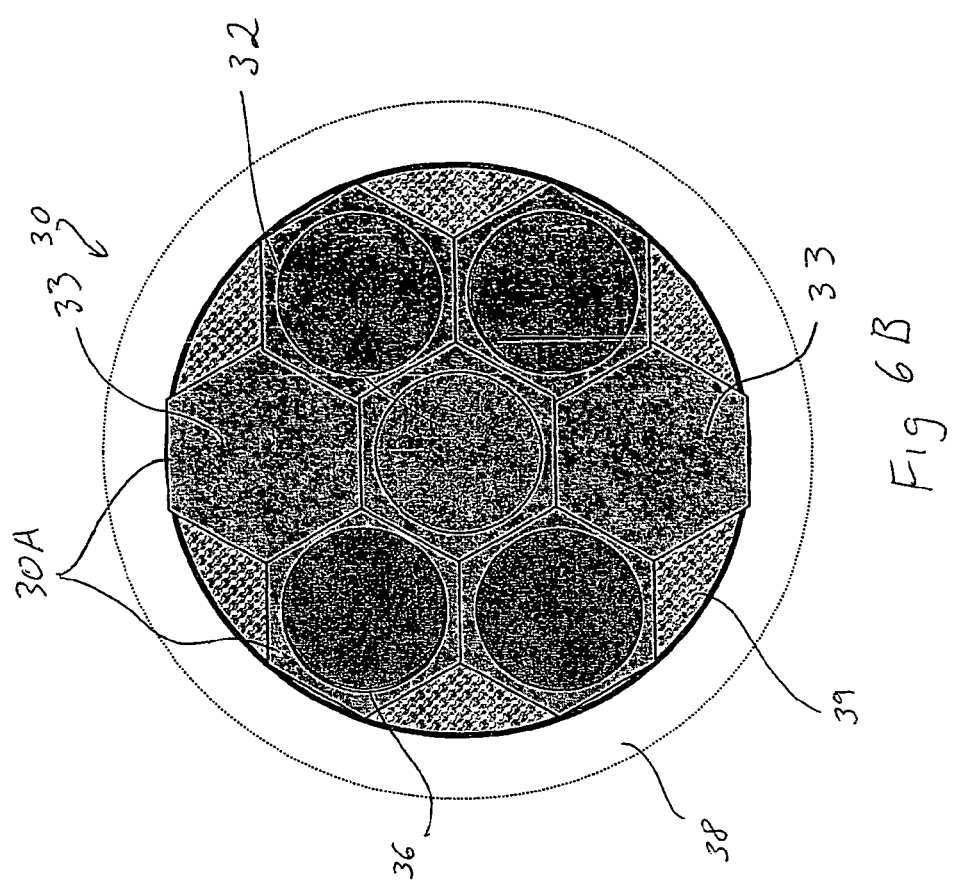
Figure 6A:
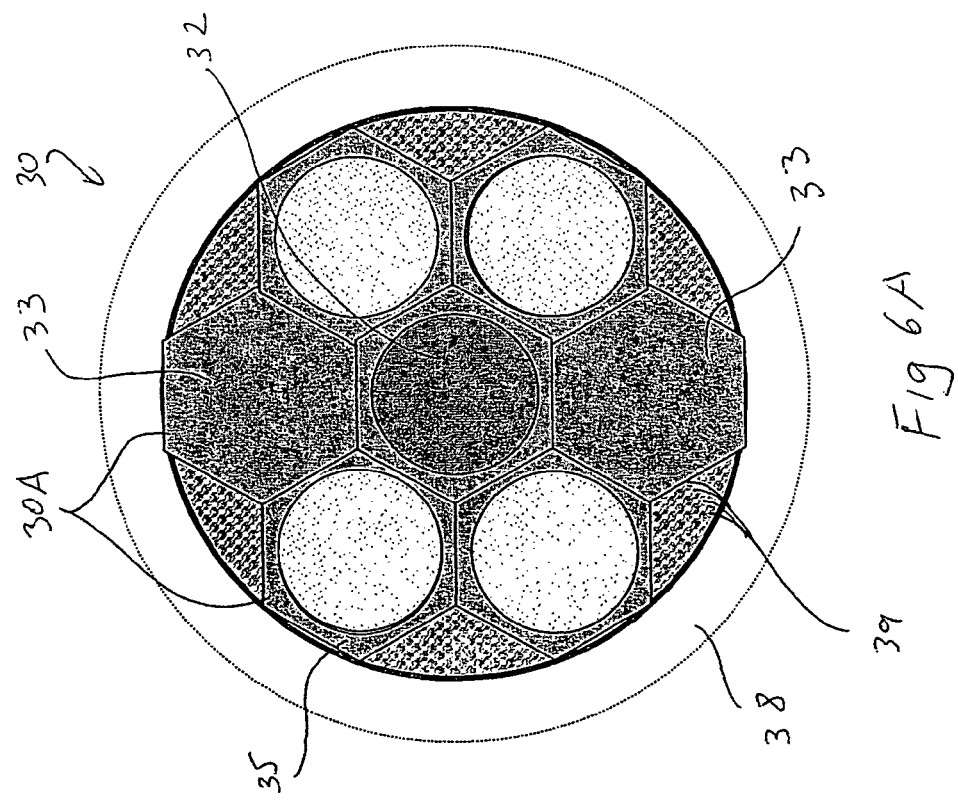
Figure 6H:
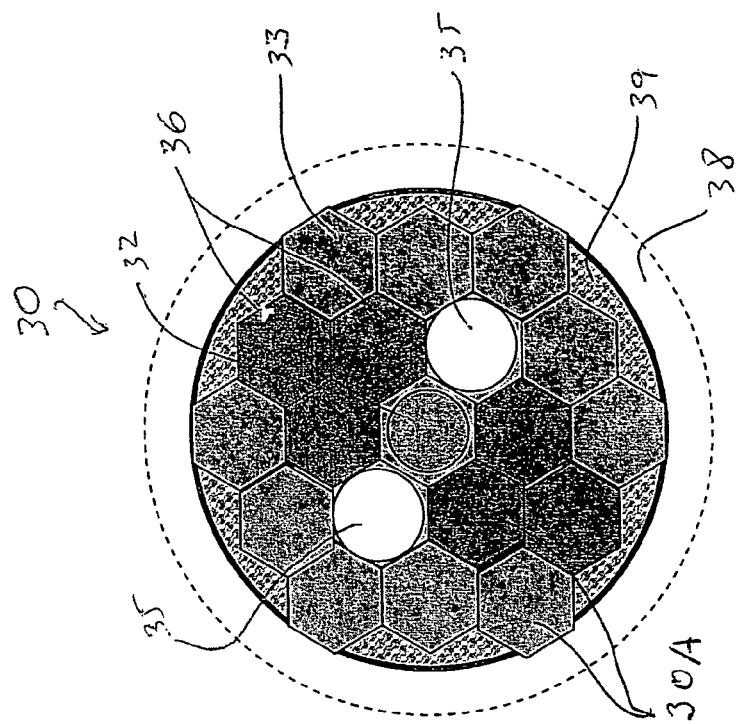
Figure 7F:
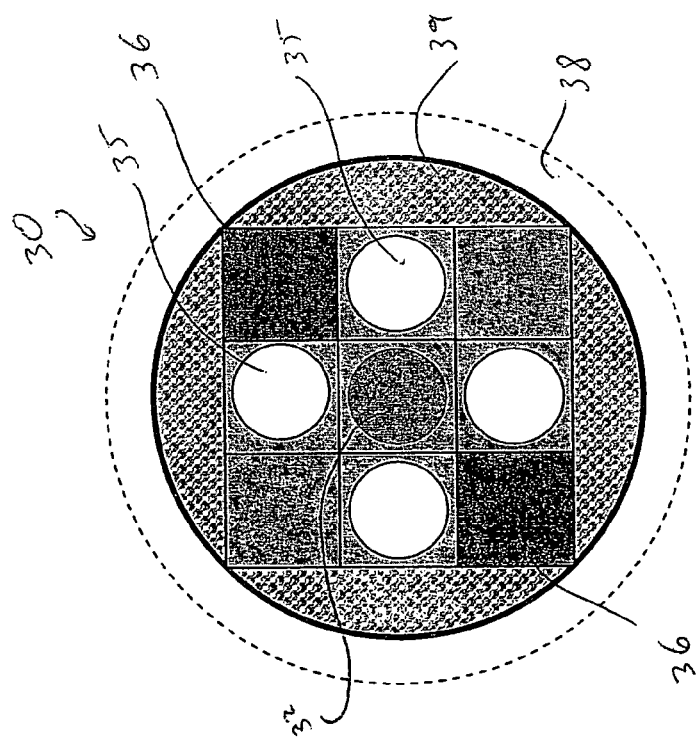
FIGS. 7A-7F illustrates schematically several other embodiments of the stacked microstructured cane utilized in making an optical fiber according to the present invention.
Figure 7A:
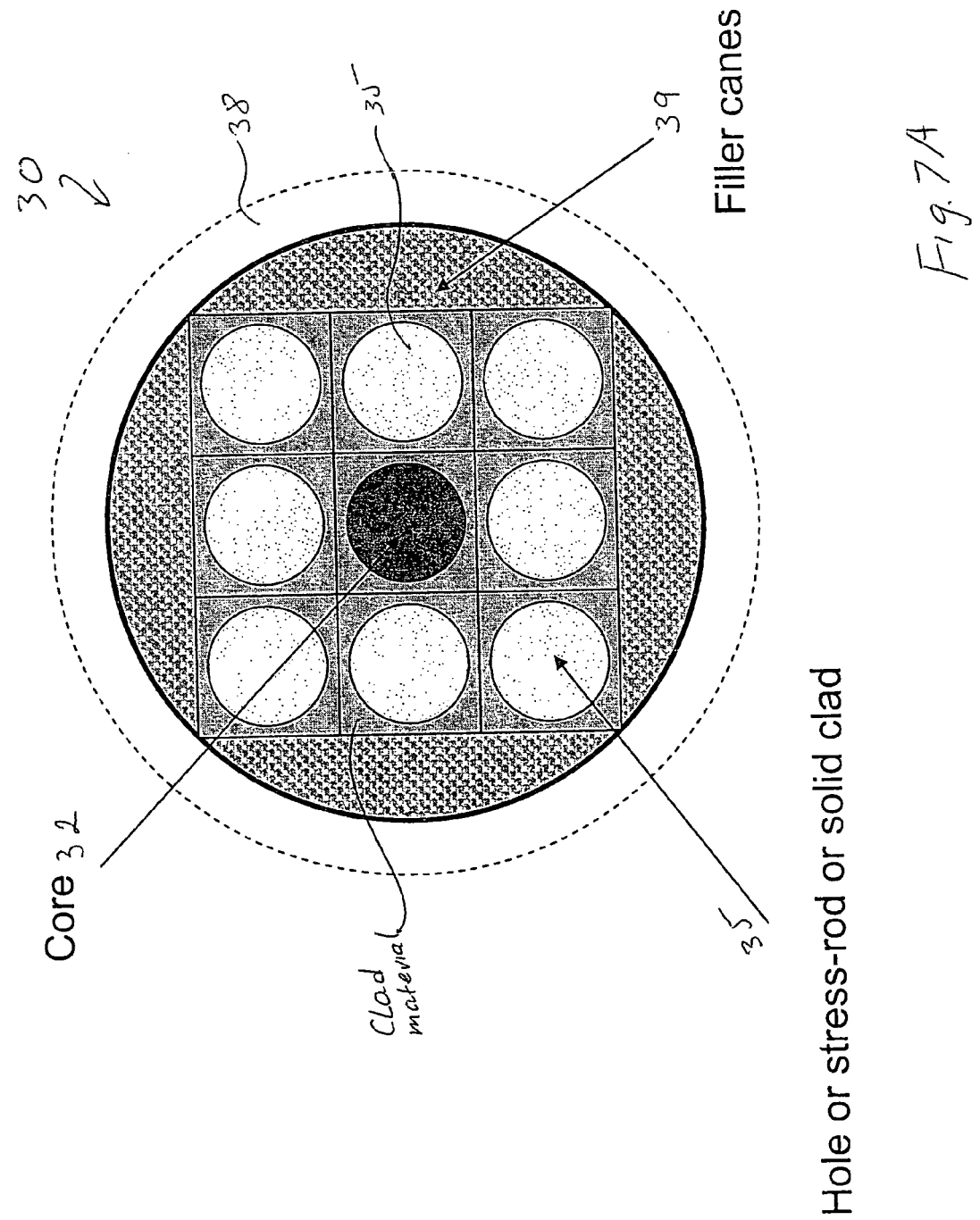
Figure 7C:
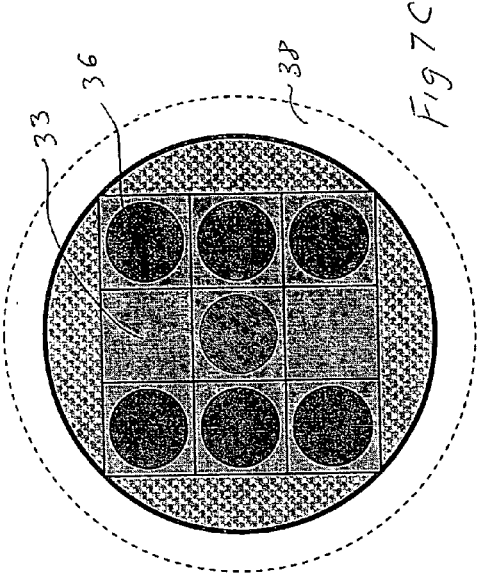
Figure 7E:
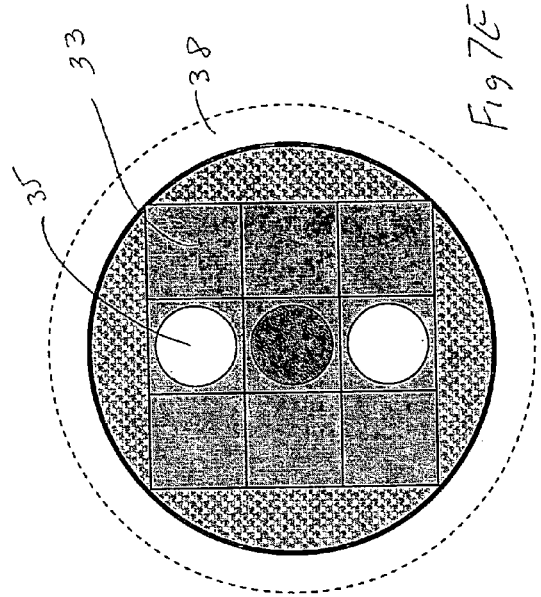
Figure 7B:
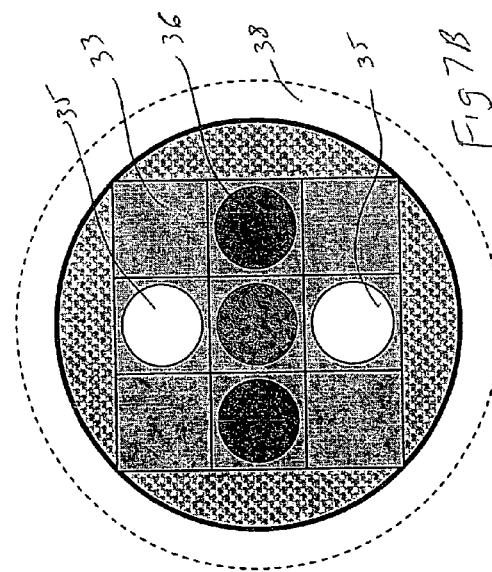
Figure 7D:
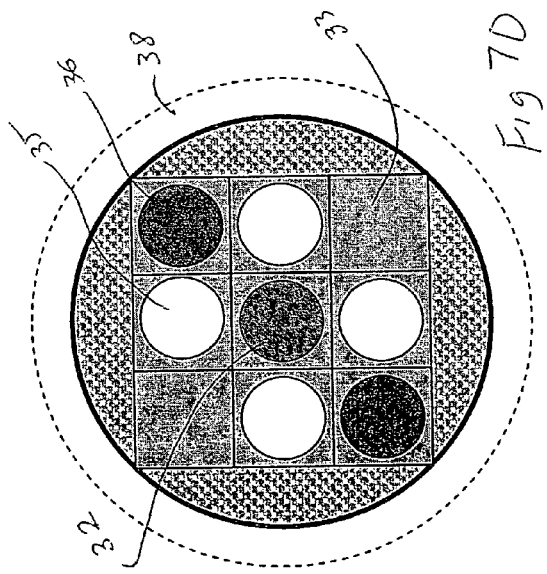

30A are hexagonal with a 60 degree angled V-groove block; or in the square block lattice packing, these blocks 30A are simply flat. To assemble the blocks 30A, the lower part of the blocks (clad-rods and/or air filled tubes and/or tubes filled with stress-rod) are for example, assembled first, followed by the middle blocks (core block with the other microstructured blocks 30A on its side), then the upper level blocks 30A corresponding to clad-rods and/or air filled tubes and/or tubes filled with stress-rod. The sub-assembly packed is secured in the desired shape, then inserted into a size-matched holding clad tube 38. The interstitials between the tube and the sub-assembly are then filled with clad-filler canes 39. It is noted that the micro-structured core cane 30 may be situated off-center with respect to the holding tube 38 as shown in FIG. 6G and may be placed within a subassembly inside a smaller clad (holding) tube 38'.

The core cane 32 and clad-rods 33 and tubes 35 may be circular in shape with small sized clad-filler canes 39 filling-in the interstitial gaps forming the closed packing (not shown). Alternatively, as described above, they can also be in hexagonal or square shapes with the clad-filler canes 39 filling only in the outer gap between the hex or square-shaped subassembly and the housing (i.e., holding) tube (see FIGS. 6A-6H, 7A-7F). To produce the microstructures (microstructure blocks) with the hexagonal or rectangular cross section one can produce the clad rods 33 or rod tubes 35 and then machine them to the desired shape. The clad rods 33 and/or

TABLE 1

| | Example | | | | | | |
|---|---|---|---|---|---|---|---|
| | A | B | C | D | E | F | G |
| Core delta relative to inner clad (%) | 0.2 | 0.2 | 0.17 | 0.1 | 0.1 | 0.1 | 0.06 |
| Core radius (μm) | 4.2 | 4.2 | 4.2 | 5 | 12.5 | 25 | 9 |
| Fiber radius (μm) | 62.5 | 62.5 | 62.5 | 125 | 125 | 250 | 125 |
| Stress rod center (μm) r4c | 22.2 | 22.2 | 22.2 | 34.5 | 43.5 | 81 | 47 |
| Stress rod radius (μm) | 13 | 13 | 13 | 24.5 | 26 | 51 | 26 |
| $GeO_2$ level in inner cladding 14 (mol %) | 4.88 | 4.88 | 4.88 | 4.88 | 4.88 | 4.88 | 4.88 |
| $GeO_2$ level in stress rods 13 &, 15 (mol %) | 0 | 4.88 | 4.88 | 4.88 | 4.88 | 4.88 | 0 |
| $B_2O_3$ level in stress rods 13 &, 15 (mol %) | 20.8 | 20.8 | 20.8 | 20.8 | 20.8 | 20.8 | 15.6 |
| Air hole radius (μm) | 5 | 5 | 6 | 10 | 12.5 | 25 | 20 |
| Birefringence at 1060 nm ($\times 10^4$) | 3.2 | 3.8 | n/a | n/a | 1.25 | 2.5 | n/a |
| Wavelength Cutoff 1 (nm) | | | 1015 | 880 | | | 916 |
| Wavelength Cutoff 2 (nm) | | | 1165 | 1205 | | | 1143 |

The process for Making Fiber

According to one embodiment, the method of making an optical fiber with holes and/or stress-rods adjacent utilizes assembling or forming a microstructured cane 30. The microstructured cane 30 comprises a stacked base blocks 30A which include a (rare-earth doped or undoped) core cane 32 in the center, with clad-rods 33 and/or air filled tubes 35 or tubes filled with stress-rods 36 situated and stacked around the core cane 32. Examples of the microstructured cane 30 are shown in FIGS. 6A-6H and 7A-7F, which illustrate hexagonal and square lattice packing, respectively of the tubes 35 and/or stress rods 36 (preferably the tubes 35 and clad rods 33 are made of the same cladding material). This sub-assembly (core and stacked microstructure surrounding the core) is then inserted into a holding (clad) tube 38. As stated above, the sub-assembly is built upon from stacked base blocks 30A. For example, in the hexagonal lattice packing, these blocks rod tubes 35 may have the refractive index identical to that of the fiber cladding. The stress rods 36 may then be inserted into the tubes 35 to provide the required birefringence in the resulting fiber. Alternatively, in order to produce stress rods 36, the rectangular, hexagonal or circular rods may be made directly from the stress rod material, so that filling the tubes 35 with stress rods will no longer be necessary.

The finished assembly comprising the tube 38, core cane 32 in the center, with clad-rods 33, stress rods 36, air filled tubes, and/or tubes 35 filled with stress-rods 36 and clad-filler canes 39 is first cleaned in a furnace with Chlorine-containing atmosphere to remove surface impurities and water, and then redrawn into a solid microstructured-cane 30. The microstructured-cane 30 will subsequently be further overcladed with additional clad material, before being drawn into a desired single-clad fiber. For double-clad fiber making, low-index outerclad material will be further applied before being drawn into a desired optical fiber or, simply using low-index polymer as the outer-clad material applied during fiber draw process.

The core cane 32, clad rods 33 and tubes 35, stress-rods 36 and filler canes 39 may be produced by the outside-vapor-deposition (OVD) process. The OVD process is a way of making optical fiber by depositing from the desired vapor ingredients (including silica and the desired dopants) reacting with oxygen in a flame to form the soot-particles on a bait rod, for making soot-preform. The soot-preform is then consolidated into solid glass in a high temperature furnace, after the bait rod is removed. The core/clad compositions are achieved by utilizing different vapor-ingredients for each of the layers in the soot preform forming process. The core preform is generated first, and then consolidated, the microstructured cane with desired holes/stress-rods adjacent to the core is then formed, followed by core/inner cladding preform generation and consolidation, which in turn, is followed by the outer cladding outside vapor deposition process and another consolidation step. The final preform is then drawn into double-clad single polarization maintaining, or other optical fiber with desired microstructuring around the core by known fiber-drawing methods.

More specifically, the following steps are utilized to make the rare earth doped double clad single polarization or polarization maintaining fiber.

Figure 9:
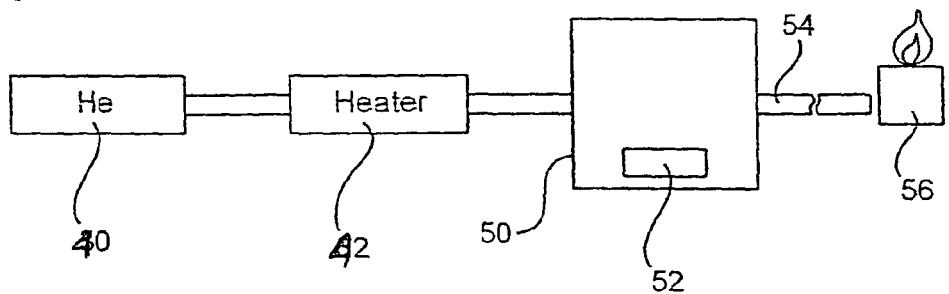
FIG. 9 is a schematic illustration of $AlCl_3$ delivery mechanism.
Figure 10:
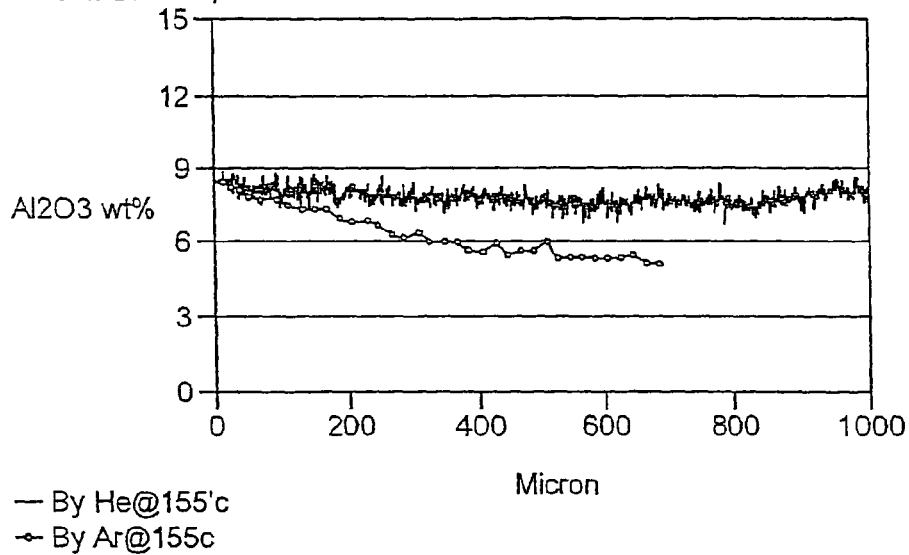
FIG. 10 illustrates $Al_2O_3$ concentration in a preform which resulted from Argon gas delivery (bottom curve) and heated Helium gas delivery (top curve)
Figure 11:
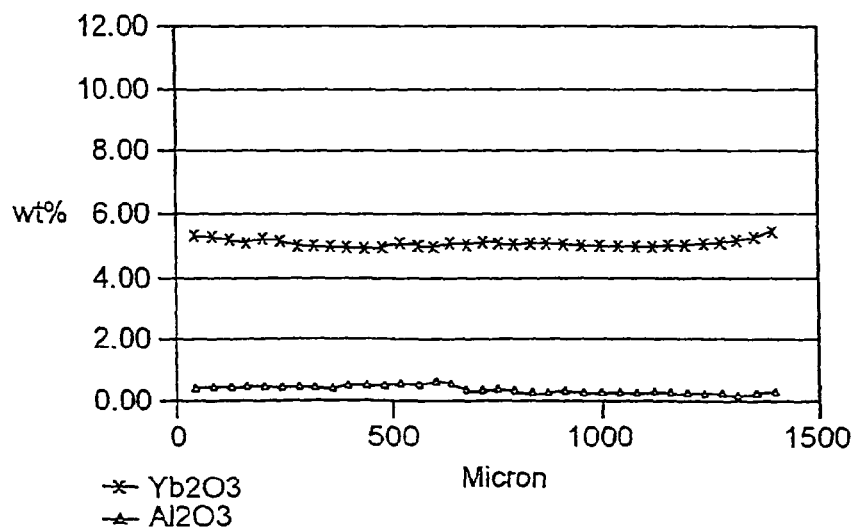
FIG. 11 is a graph illustrating $Yb_2O_3$ and $Al_2O_3$ concentration within a core optical fiber preform.

1. Core cane formation. The core cane 32 is formed first. The core is manufactured, for example, by a standard OVD process. The core materials are deposited onto the bait rod during the laydown step. The exemplary vapor-precursor-materials used to make the fiber core cane are $Yb(fod)_3$, $AlCl_3$, $SiF_4$, $SiCl_4$, $GeCl_4$ and tri-ethyl borate. Other rare-earth materials may be utilized either in addition to Yb, or instead of Yb. During the core deposition process we achieved a uniform $AlCl_3$ gas-phase delivery. This was accomplished by utilizing heated inert Helium as carrier gas 40 (instead of Argon gas) for $AlCl_3$ delivery illustrated schematically in FIG. 9. As solid $AlCl_3$ changes into vapor (gas) phase, it consumes a large amount of heat. Helium gas has high thermal conductivity; effectively transfers heat to $AlCl_3$, and maintains constant vapor pressure of $AlCl_3$. It is preferable that Helium gas is provided at a temperature within 150° C. to 180° C. range. As illustrated in FIG. 9, the heated Helium gas is provided by the He gas heater 42 to the oven 50 containing $AlCl_3$ vessel 52. The relatively high Helium gas temperature helps to maintain the $AlCl_3$ containing vessel 52 at a constant temperature of about 140° C.-160° C. In order to make the optical fiber of this example, Helium gas was heated via heater 42 to 168° C. and the vessel 52 temperature was held constant at 145° C. Higher vessel temperature results higher concentration of Al in the preform. In addition, the Helium gas flow rate was also adjusted for the most uniform delivery throughout the core doping process. In this example, a 10% flow-rate slope (liter/min) is used for the delivery. (The increase in flow rate with subsequent passes was utilized for all other dopants of the core and claddings.) Heated Helium gas carries $AlCl_3$ vapor via a heated gas line 54 to the flame burner (gas burner) 56. To produce the core preform of this example, a 100 passes of core deposition process is started with 1.2 liter/min (pass #1) and ended (after pass # 100) with 1.65 liter/min, resulting in soot preform core thickness of about 2 mm to 3 mm. Heated Helium based $AlCl_3$ delivery may be utilized not only to form a fiber core, but to also provide Al doping to other fiber layers (e.g. cladding), if uniform Al doping of such layers is desired. Furthermore, heated Helium assisted delivery may be also utilized for materials other than $AlCl_3$, which are also endothermic (i.e. heat-absorbing). An Argon gas delivery instead of the Helium gas delivery of $AlCl_3$ may be utilized, but a Helium gas delivery of $AlCl_3$ results better uniformity of $Al_2O_3$ concentration. (See FIGS. 10 and 11). It is preferable that $Al_2O_3$ is evenly distributed throughout the core layer because its presence assists in de-clustering of rare earth dopant(s) within the core. This results-in high laser/amplifier efficiency through reduced quenching. This delivery process can also be utilized in Al doped (for example, in order to replace Ge) transmission fiber (i.e. fiber without rare-earth dopants in the core) when a fiber layer with relatively high index of refraction (i.e. higher than silica) is needed.

The Yb vapor delivery is carried by Argon gas and is accomplished by heating organometallic $Yb(fod)_3$ in the temperature range of 150° C.-180° C., which results in a soot preform core with $Yb_2O_3$ concentration from about 0.2 wt % to 3 wt %. In order to make the optical fiber 10 of this example, the $Yb(fod)_3$ containing vessel temperature of 163° C. was used to achieve the $Yb_2O_3$ concentration of about 0.6 wt %. The delivery of other materials is carried out by conventional oxygen delivery at temperatures below 100° C.

Figure 12:
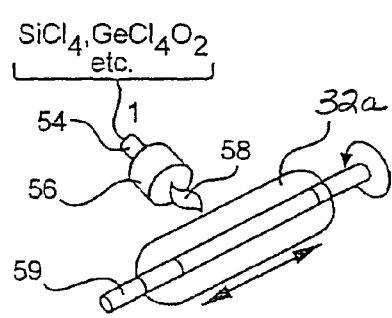
FIG. 12 is a schematic illustration of the formation of a core soot preform.

More specifically, according to one embodiment of the present invention, the $Yb(fod)_3$, $AlCl_3$, $SiF_4$, $SiCl_4$ and $GeCl_4$ are delivered to a gas burner 56. (See FIG. 12.) The gas burner 56 generates a temperature of about 2000° C. The pre-determined amounts of various vapor-phase materials delivered for each core (or clad) stage are carried by oxygen provided to the burner 56, and react in the burner flame 58 where the desired glass-soot particles formed. The soot particles are then deposited onto a rotating bait-rod 59 forming core cane 30 through the thermopheretic mechanism to result in the designed soot-preform 62 which will be used to manufacture single polarization fiber with the Yb-doped single-mode core.

After the core soot preform layer is layered down and the soot preform 32a is cooled to room temperature, the bait rod 59 is removed from the center of core soot preform 32a. The core soot preform 32a is then consolidated (densified into the solid glass) to become a solid glass-preform 32b which is drawn into core cane 32. (See FIGS. 13 and 14.)

Figure 13:
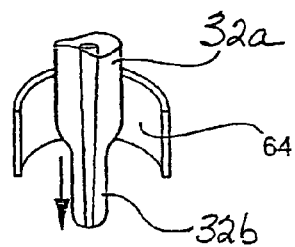
FIG. 13 illustrates consolidation of a soot preform into a glass preform.
Figure 14:
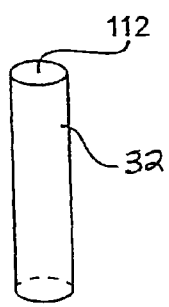
FIG. 14 illustrates schematically a core cane utilized to manufacture the fiber of FIGS. 1B, 1C, 4A-4C, and 19A-19B.

Applicants discovered that a proper choice of high temperature and fast down-feed rate during consolidation results in low crystallization formation in the resulting solid glass preform, which results in an optical fiber having very low passive (background) loss, and also eliminates the conventional double-redraw process associated with Al doped blanks. More specifically, soot preform 32a is down fed relative to the furnace at the rate and temperature sufficient to minimize crystallization such that the background loss of the resultant fiber core is less than 8 dB/km, and preferably 3 dB/km or less, and more preferably less than 1 dB/km at a wavelength of 1280 nm. As illustrated in FIG. 13, the 'core' soot preform 32a is consolidated into solid glass-preform 32b in a high temperature (1400° C. to 1600° C.) furnace 64. It is preferred that the furnace temperature during consolidation be 1500° C. to 1600° C., and more preferably 1530° C. to 1580° C. In order to produce the optical fiber 10 of this example we utilized the furnace temperature of 1550° C. Applicants found that for temperatures of below 1500° C. the preform glass forms crystals and the amount of crystallization is significantly reduced with furnace temperatures of above 1530° C. While in the furnace, the soot preform 32a is moved relative to the furnace 64 (e.g., down-fed) at a rate of 7 mm/min or faster. It is preferred that this rate be 8 mm/min to 12 mm/min. The optical fiber of this example made by down-feeding the soot preform 32a at the rate of 9 mm/min. It is noted that instead of down-feeding the soot preform, the soot preform may be held in a constant position and the furnace may be moved instead. Thus, by specifying that the soot preform is moved relative to the furnace, applicants intend to cover any relative movement between the soot preform and the furnace. Generally, it is recommended that the higher the furnace temperature, the faster the rate of relative motion between the furnace and the soot preform.

Figure 8:
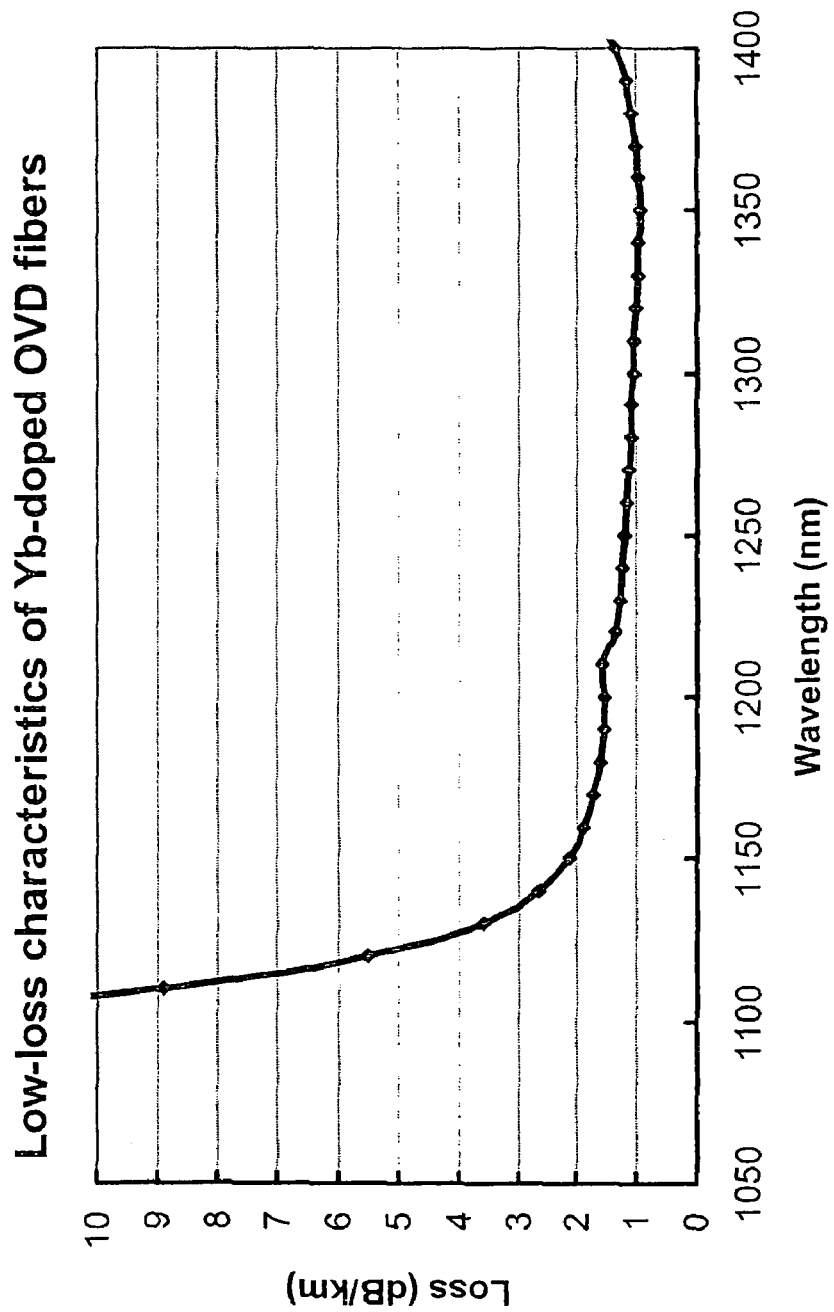
FIG. 8 is a graph illustrating passive core loss vs. wavelength of the exemplary optical fiber according to one embodiment of the present invention.

With the above described high consolidation temperatures and fast down-feed rate, the resultant optical fiber 10 has the core background loss of less than 8 dB/km. More preferably, the optical fiber exhibits core background loss of less than 5 dB/km. In this example the background loss of the core is less than 1 dB/km (FIG. 8). The core background loss was measured by making (single mode) optical fiber without the outer cladding and measuring the background loss of this fiber.

The core soot preform 32a has-sufficient amount of Ge to produce, after the cladding process is completed, a fiber with core delta of 0.06 to 0.1%. After the core preform 32a has been consolidated, as described above, it is drawn into the core cane 32. The core cane 32 is preferably 1 meter long and about 8 mm in diameter. The core cane 32 is illustrated schematically in FIG. 14.

2. Stress-rods fabrication. Additionally, a soot-preform containing the desired amount of B, P or Ge (for example in the amounts described above) for stress generation can be made in a similar manner by OVD with the use of the respective vapor ingredient. The soot preform is subsequently consolidated, and is redrawn into a solid rod as the stress-applying part 13, 15.

3. Clad-rods and-tubes fabrication. Soot-preform containing the desired amount of $GeO_2$ is deposited on rod-bait or tube-bait in a similar manner by OVD with the use of $GeCl_4$ as the precursor chemical. The clad composition in this example is Ge-up-doped to allow an easily-managed low-NA, large-mode-area core for high power fiber lasers. The soot preforms are subsequently consolidated, and redrawn into solid rod or tube by the known methods.

4. Microstructured-cane formation. The cane 30 is formed by assembling the rare-earth doped core cane 32 with microstructures chosen from: clad-rods, tubes, stress rods rods or tubes filled with stress-rods. The microstructures are arranged, as shown in FIGS. 6 and 7 in hexagonal or square lattice packing, respectively, then inserted into a clad tube. The core cane 32 and the microstructure, including clad-rods 33 and air filled tubes 35 can be circular in shape with clad-filler canes (interstitial clad canes) 39 filling-in the interstitial gaps thus forming the closed packing. Alternatively, they can also be in hexagonal or square shapes with the clad-filler canes only in the outer gap between the hex or square-subassembly and the holding tube. The assembly is first cleaned in a chlorine-containing atmosphere to remove surface water and impurities etc and then, redrawn into a solid microstructured-cane (having holes and/or stress-rods adjacent to the core) for further processing.

Figure 15:
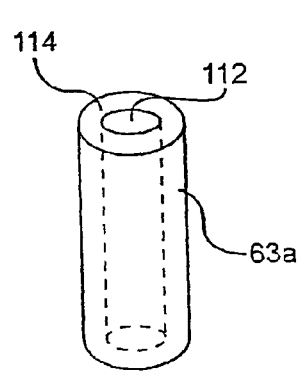
FIG. 15 illustrates schematically a core-clad cane utilized to manufacture the fiber of FIGS. 1B, 1C, 4A-4C, and 19A-19B.

5. Additional clad formation. The microstructured cane 30 is overclad with additional Ge-doped silica soot to form the final core/inner-clad (soot) blank (referred herein as the inner-clad bank 63) with a desired core/inner-clad ratio (typically in 1/10 to 1/20 range). The inner-clad soot blank is subsequently dried in a chlorine-containing atmosphere, and consolidated in a He atmosphere in a typical OVD manner to form cane 63A. The cane 63A is about 35-45 mm in diameter. Cane 63A is illustrated schematically in FIG. 15.

Alternatively a sleeving process may be utilized to form cane 63A, by placing a Ge-doped silica sleeve around the core cane 30.

The consolidated blanks 63A are then machined, if needed (as this is typically not always necessary when holes and/or stress-rods are micro-structured adjacent to the core in the clad), to the desired outer perimeter shape. Breaking circular symmetry in the inner clad layer enhances pump light absorption efficiency. The machined blank is overclad again, for example by $SiO_2$ with index lowering dopants such as B and or F, and then consolidated to a consolidated blank 71. The down-doped silica layer of the consolidated blank 71 will form the outer cladding of the optical fiber 10. If boron is used in overcladding, it is preferred that consolidation is performed in Fluorine environment. In this example, the index lowering dopants are B and F.

Figure 16:
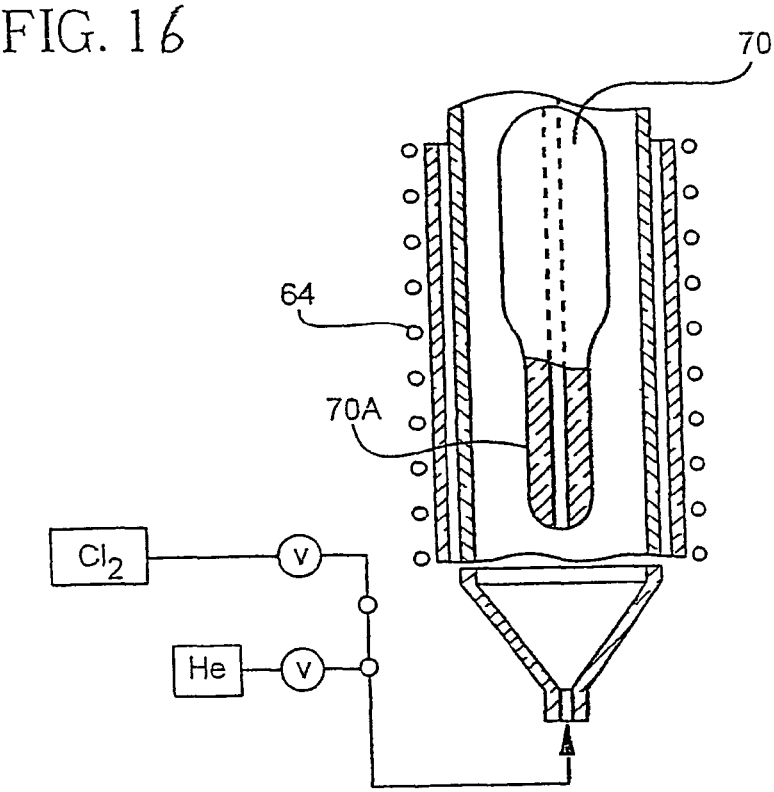
FIG. 16 illustrates schematically an exemplary consolidation process utilized to manufacture the fiber of FIGS. 1B, 1C, 4A-4C, and 19A-19B.
Figure 17:
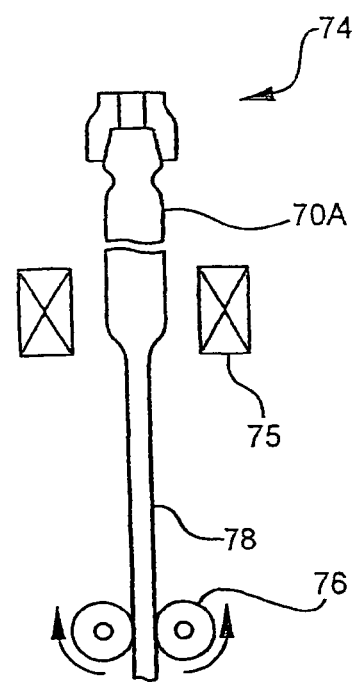
FIG. 17 illustrates schematically a redraw tower utilized to manufacture the fiber of FIGS. 1B, 4A-4C, and 19A-19B.

More specifically, $B_2O_3$ and $SiO_2$ were vapor deposited on the ground glass preform to form a $B_2O_3$ and $SiO_2$ soot layer by using tri-ethyl borate or $BCl_3$ and $SiCl_4$ delivered to the burner. The blank (i.e. machined or ground glass preform) covered with the $B_2O_3$—doped silica soot layer was then Fluorine doped during the consolidation step (FIG. 16) by using $SiF_4$ gas provided to the consolidation furnace and then redrawn (FIG. 17). During this second consolidation step (FIG. 16), the consolidation furnace is operated at the temperature range of about 1200-1300° C. At these consolidation temperatures Fluorine diffuses into the boron/silica soot layer, but does not penetrate into the underlying glass layer. The optical fiber of this example was produced by utilizing consolidation temperature of 1250° C., so as to facilitate adequate Fluorine doping through diffusion. In this example, the third layer of the preform (outer cladding) has a shape similar to that of the second layer (inner cladding).

Figure 18:
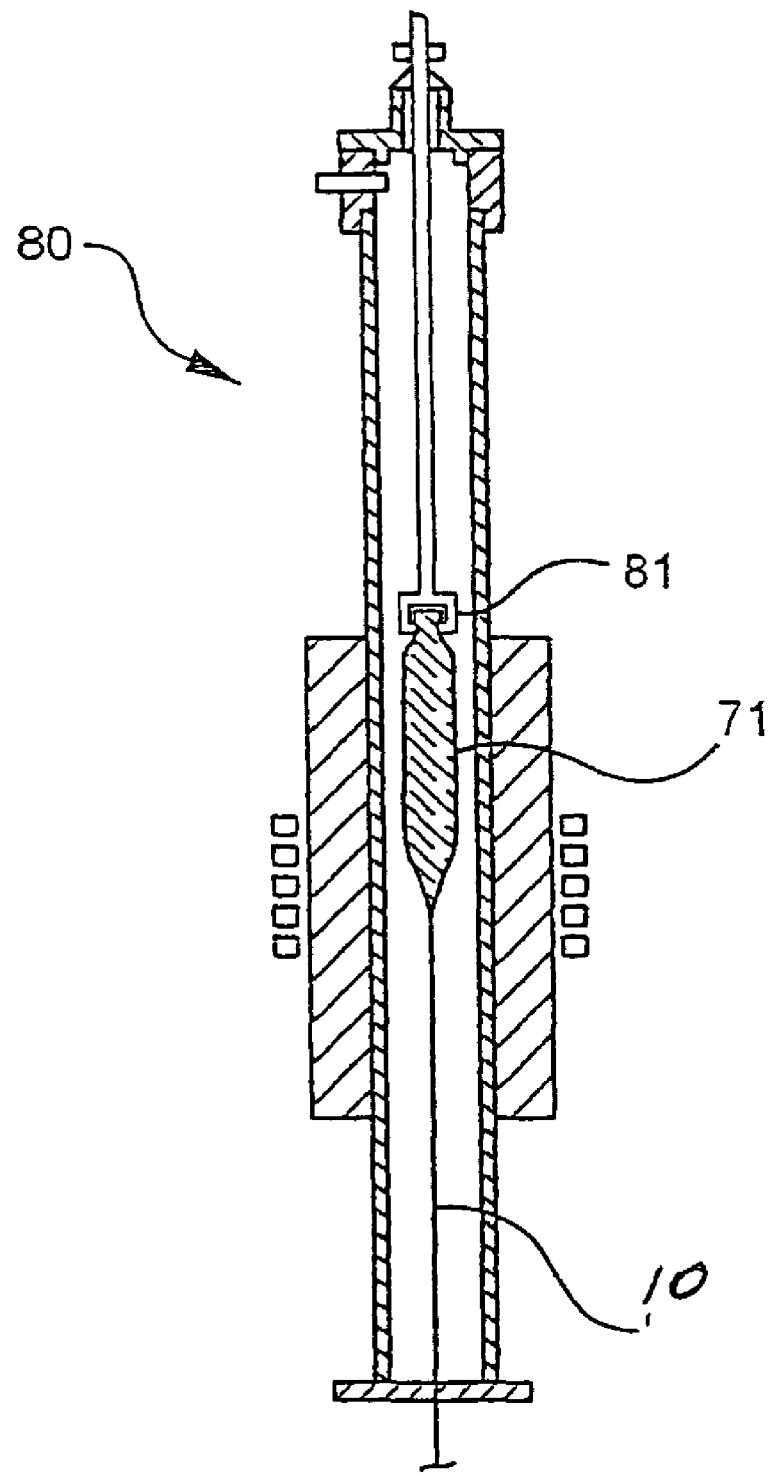
FIG. 18 illustrates schematically a process for drawing fiber utilized to manufacture the fiber of FIGS. 1B, 1C, 4A-4C and 19A-19B.

The consolidated blank 71 is then suspended from a handle 81 in a draw furnace 80 as shown in FIG. 18 and a fiber 10 is drawn therefrom. During draw, a small positive pressure (about 1 psi or less) is applied to the holes to keep them from closing. This causes the core to become (more) elliptically shaped. In the exemplary fiber depicted in FIGS. 1B, 1C and 4A-4C we utilize positive pressure of less than 0.1 psi. The draw speed is about 1 m/sec. The resulting fiber has an elliptically shaped core and, dual stress rods and dual air holes.

Therefore, according to one embodiment of the present invention a method of making an optical fiber with a solid core, (the resulting fiber not being a photonic crystal fiber), the method including the steps of: (i) manufacturing a core cane; (ii) situating a plurality of microstructures selected from rods, air filled tubes and glass filed tubes and placing the microstructures adjacent to said core cane, the microstructures forming no more than 3 layers (preferably 2 or less); (iii) placing said core cane with the adjacent microstructures inside a holding clad tube; and (iv) placing interstitial cladding rods inside said holding tube, thereby forming an assembly comprising a tube containing a core cane, a plurality of microstructures and interstitial cladding rods; and then drawing this assembly into a microstructured cane. For example, FIG. 6G illustrates an assembly that includes 2 layers of rods and tubes around the core cane 32 (i.e. the base blocks 30A are situated 2 layers deep around the core cane 32). The microstructured cane is then drawn to an optical (not photonic crystal) fiber that contains the air holes and/or stress rods. It is preferable, when making a SP fiber that the fiber have two stress rods and two air holes arranged symmetrically around the core.

As should be recognized, the elongation of the core may occur in the redraw step, the draw step, or combinations thereof to achieve the desired aspect ratio of the central core. In either case, a positive pressure is applied to the holes in the preform (and fiber) to cause the elongation to occur.

It will be apparent to those skilled in the art that variations and modifications can be made to the present invention without departing from the scope of the invention. For example, although step index structures are show, other graded index structures may be employed. Moreover a ring structure may be added to the fiber profile as well and would still function acceptably.

Example 1

Figure 19A:
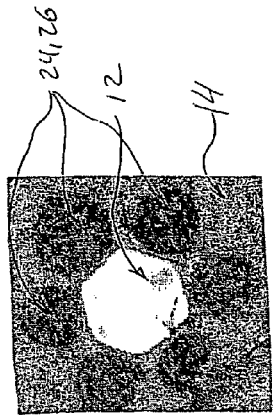
FIGS. 19A and 19B show partial cross-sections of a highly dispersive nonlinear optical fibers made according to one embodiment of the method of the present invention, the fiber having 6 air holes around the high-delta core.
Figure 19B:
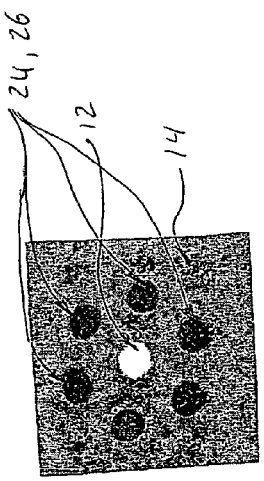

FIG. 19A shows the cross-section of a highly dispersive, non-linear optical fiber made with the current invention having 6 holes adjacent to the high Ge-doped core in the single-clad fiber. Using this fiber structure, generally average refractive index delta from −30% to 0% percent can be made depending on the number of holes in the cladding. The holes in the inner cladding make the average index lower than the pure silica, creating an effective depressed cladding structure. The average index value depends on the how many air holes or the percentage of air volume in the inner-cladding layer. The low depressed cladding delta enables making very small effective area fibers. On the other hand, the fibers are much easier to make by the method described in this invention than those used in the conventional photonic crystal fiber making. The structure allows us to make an effective area as small as 5-10 $\mu m^2$, and dispersion between 0-80 ps/nm·km at 1550 nm for nonlinear fiber-optic applications. In addition, FIG. 19B shows an example of variation in fiber structures the invented fiber process is capable of producing. The fiber 10 of FIG. 19B has a hexagonal core 12.

Example 2

Figure 21:
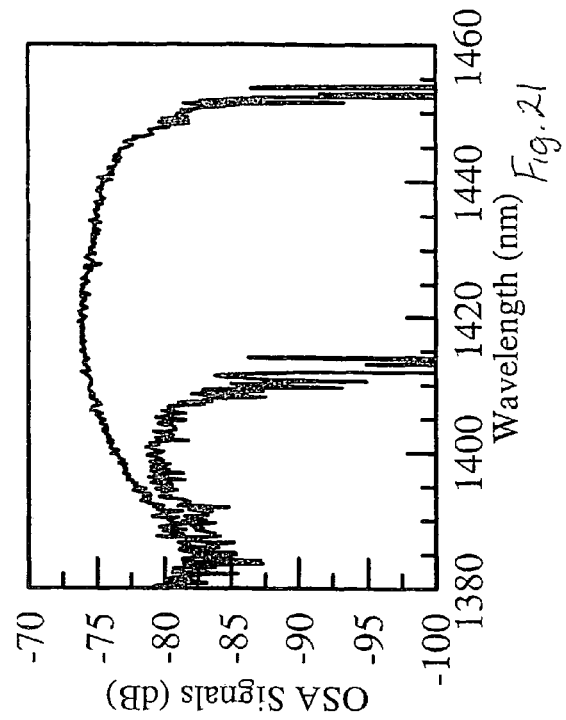
FIG. 21 illustrates measured single-polarization bandwidth of the fiber of FIG. 20.
Figure 20:
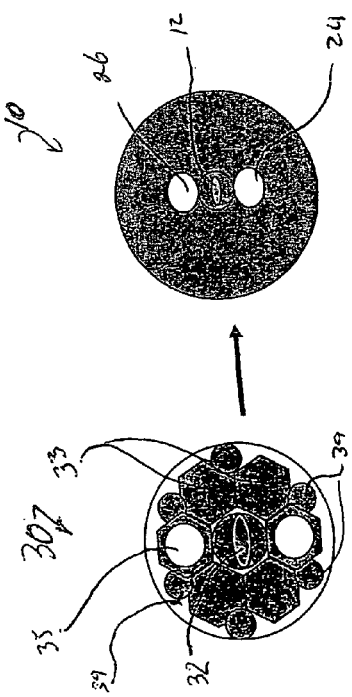
FIG. 20 shows a schematic of a dual-hole assisted single-polarization fiber made according to one embodiment of the method of the present invention.

FIG. 20 shows the process flow of the invented method for making dual air-hole double-clad fiber in Suppression of stimulated Raman gain in high-power fiber lasers when employing such fiber as the gain media. Dual-hole-assisted fiber is a typical micro-structured fiber including of a glass core and a cladding having two air-holes running along the fiber length. These holes 24, 26 are adjacent to the core 12 and are symmetrically placed relative to the core center along a common axis comprising the core and holes' centers. An important property of dual-hole-assisted fiber is that of having a fundamental-transverse mode cut-off wavelength. Through proper design, this cut-off wavelength can be polarization resolved, thus providing the means to achieve single-polarization propagation. The spectral range between the cut-off wavelengths of each of the two orthogonal polarization modes defines the single-polarization bandwidth of this fiber. By carefully overlapping the single-polarization bandwidth with the gain profile of the dopant, single-transverse-mode and single-polarization high power, double-clad all-fiber lasers can be achieved. The fiber made with this invention has allowed such fiber to be made in consistency, has shown excellent single-polarization band width (see FIG. 21), and demonstrated its usefulness as SRS filters in high power fiber lasers.

It will be apparent to those skilled in the art that-variations and modifications can be made to the present invention without departing from the scope of the invention. For example, although step index structures are show, other graded index structures may be employed. Moreover a ring structure may be added to the fiber profile as well and would still function acceptably. Thus, it is intended that the present invention cover the modifications and variations of this invention provided they come within the scope of the appended claims and their equivalents.

What is claimed is:

1. A method of making a non-photonic crystal fiber optical fiber including at least one air hole and/or at least one stress rod, said method comprising:
   (i) manufacturing a glass core cane;
   (ii) situating a plurality of microstructures with non-circular outer diameter in contact with one another, said plurality of microstructures selected from at least two types of microstructures: rods, air filled tubes, and/or glass filled tubes with an index of refraction different from that of said core cane, and
   placing said microstructures adjacent to said core cane, said microstructures forming no more than 3 layers around said core cane such that there are no interstitials formed therebetween;
   (iii) placing said core cane with said adjacent microstructures inside a holding clad tube; and
   (iv) placing interstitial cladding rods inside said holding tube, thereby forming an assembly comprising a tube containing a core cane, a plurality of microstructures and interstitial cladding rods;
   (v) drawing said assembly into a microstructured cane; and
   (vi) drawing an optical fiber from said microstructured cane.

2. A method of making a non-photonic crystal fiber optical fiber, said fiber including at least one air hole and at least one of: (i) stress rod or (ii) glass filled tube adjacent to the core, said method comprising:
   (i) manufacturing a glass core cane;
   (ii) situating a plurality of microstructures with non-circular outer diameter in contact with one another, said plurality of microstructures selected from rods, air filled tubes, and/or glass filled tubes with an index of refraction different from that of said core cane, and
   placing said microstructures adjacent to said core cane, said microstructures forming no more than 3 layers around said core cane such that there are no interstitials formed therebetween;
   (iii) placing said core cane with said adjacent microstructures inside a holding clad tube; and
   (iv) placing interstitial cladding rods inside said holding tube,
   thereby forming an assembly comprising a tube containing a core cane, a plurality of microstructures and interstitial cladding rods;
   (v) drawing said assembly into a microstructured cane; and
   (vi) drawing an optical fiber from said microstructured cane, said method further comprising the steps of
   situating at least one air filled tube adjacent to said core cane;
   situating at least one stress rod or at least one glass filled tube with an index of refraction different from that of said core cane; and
   placing inside a holding clad tube: said core cane, said at least one air filled tube and at least one of (i) stress rod or (ii) glass filled tube with an index of refraction different from that of said core cane.

3. The method of claim 1, further comprising the step of placing clad rods adjacent to said core prior to adding said interstitial cladding rods.

4. The method of claim 1 further comprising the step of overcladding said microstructured cane with the first overcladding material.

5. The method of claim 4, further providing a second overcladding with a different index of refraction over said first overcladding.

6. The process of claim 1, including situating an even number of said air filled tubes and an even number of said rods, symmetrically placed around the core cane.

7. The process according to claim 1 wherein said rods are stress rods.

8. The method of making a non-photonic crystal fiber optical fiber according to claim 1, wherein at least a center of said core cane is not situated in the center of said holding tube.

9. A method of making a non-photonic crystal fiber optical fiber, said method comprising:
   (i) manufacturing a solid core cane;
   (ii) situating a plurality of microstructures with non-circular outer diameter in contact with one another, said plurality of microstructures selected from rods, air filled tubes and glass filled tubes, and placing said microstructures adjacent to said core cane in a non-circularly symmetrical pattern, said microstructures forming no more than 3 layers such that there are no interstitial holes formed therebetween;
   (iii) placing said core cane with said adjacent microstructures inside a holding clad tube; and
   (iv) placing interstitial cladding rods inside said holding tube,
thereby forming an assembly comprising a tube containing a core cane, a plurality of microstructures and interstitial cladding rods;
   (v) drawing said assembly into a microstructured cane; and
   (vi) drawing a non-photonic crystal fiber optical fiber from said microstructured cane.

10. The method of claim 9, wherein said fiber includes air holes and/or stress rods.

11. The method of making a non-photonic crystal fiber optical fiber according to claim 9, said fiber including at least one air hole and at least one of: (i) stress rod or (ii) glass filled tube adjacent to the core, said method comprising:
   situating at least one air filled tube adjacent to said core cane;
   situating at least one stress rod or at least one glass filled tube with an index of refraction different from that of said core cane; and
   placing inside a holding clad tube: said core cane, said at least one air filled tube and said at least one (i) stress rod or (ii) glass filled tube.

12. The method of making a non-photonic crystal fiber optical fiber according to claim 1, wherein said core is silica based core doped with at least one index dopant selected from: Al, Ge, Y, La, Sb, P.

13. The method of making a non-photonic crystal fiber optical fiber according to claim 2, wherein said stress rods are hexagonal or rectangular.

14. The method of making a non-photonic crystal fiber optical fiber according to claim 9, wherein said stress rods are solid, rectangular rods.

15. A method of making a non-photonic crystal fiber optical fiber, said method comprising:
   (i) manufacturing a glass core cane;
   (ii) situating a plurality of microstructures with non-circular outer diameter in contact with one another, said plurality of microstructures including at least two stress rods, said microstructures forming less than 3 rings of microstructures around said core cane and there are no interstitials formed therebetween;
   (iii) placing said core cane with said adjacent microstructures inside a holding clad tube; and
   (iv) placing interstitial cladding rods inside said holding tube,
thereby forming an assembly comprising a tube containing a core cane, a plurality of microstructures and interstitial cladding rods;
   (v) drawing said assembly into a microstructured cane; and
   (vi) drawing an optical fiber from said microstructured cane.

* * * * *